US006494245B1

(12) United States Patent
Simone

(10) Patent No.: US 6,494,245 B1
(45) Date of Patent: Dec. 17, 2002

(54) APPARATUS FOR AUTOMATICALLY AND CONTINUOUSLY APPLYING SEALANT MATERIAL IN AN INSULATED GLASS ASSEMBLY

(76) Inventor: Albert A. Simone, 110 Egel Ave., Middlesex, NJ (US) 08846

(*) Notice: Subject to any disclaimer, the term of this patent is extended or adjusted under 35 U.S.C. 154(b) by 198 days.

(21) Appl. No.: 09/699,766

(22) Filed: Oct. 30, 2000

(51) Int. Cl.[7] .......................... C03C 27/10; B05C 5/02; B05C 7/06

(52) U.S. Cl. ....................... 156/578; 156/107; 156/109; 156/285; 156/244.22; 156/500

(58) Field of Search ................................ 156/107, 109, 156/244.22, 292, 500, 575, 578, 285

(56) References Cited

U.S. PATENT DOCUMENTS 5,650,029 A * 7/1997 Lanfond ..................... 156/107

FOREIGN PATENT DOCUMENTS

DE 4438125 C1 * 2/1996 ........... B05C/11/10

* cited by examiner

*Primary Examiner*—Sam Chuan Yao
(74) *Attorney, Agent, or Firm*—Ezra Sutton

(57) ABSTRACT

An apparatus for applying sealant material continuously to an insulated glass panel assembly having a spacer frame with first, second, third and forth perimeter edges and corners defining a sealing area for receiving sealant material therein. The appartus includes a swivel dispensing head assembly (500) having a dispensing nozzle (502) thereon for applying sealant material in a continuous motion to the sealing area of the first, second, third and forth perimeter edge of the spacer frame of the insulted glass panel assembly. The swivel dispensing head assembly (500) includes a swivel rotation member sub-assembly (510) for swiveling and rotating the dispensing nozzle (502) around each of the first, second, third and forth corners of the spacer frame of the insulated glass panel assembly, wherein the dispensing nozzle applies the sealant material within the sealing area of the spacer frame; and also includes a dispensing valve sub-assembly (530) for transferring and controlling the flow movement of the sealant material from a sealant material drum via a material supply hose to the dispensing nozzle. The apparatus additionally includes a frame assembly having a frame housing with an air float tabletop and a glass air float and suction assembly having a plurality of air hose members for supplying air to support and float the insulated glass panel assembly.

48 Claims, 20 Drawing Sheets

APPARATUS FOR AUTOMATICALLY AND CONTINUOUSLY APPLYING SEALANT MATERIAL IN AN INSULATED GLASS ASSEMBLY

FIELD OF THE INVENTION

This invention relates to an automated system for applying sealant along the four perimeter edges of an insulated glass unit assembly. More particularly, the system utilizes a unique method of holding the glass panel in place and for applying the sealant material by a dispensing head that moves completely around the four perimeter edges of the insulated glass assembly in a single continuous motion.

BACKGROUND OF THE INVENTION

Insulating glass includes an assembly of two sheets of panels of glass separated by one or more spacers so that there is a layer of insulating air between the two panels of glass. To seal in the insulating layer of air, a sealant material must be applied to each perimeter edge of the glass panel in the space formed between the spacer and the edges of the glass panels. In order to form a good seal, the two glass panels must be accurately aligned relative to each other, and, in addition, the spacer along each edge of the glass assembly must be properly spaced and aligned relative to the two glass panels. As a still further condition for forming a good seal, the glass assembly and spacers must be maintained in proper alignment while the sealant material is being applied thereto. Finally, the sealant material must be applied in such a way that it is uniform and covers the entire edge of the glass assembly.

The application of adhesive or other sealant material to substrates is well known and is particularly well known in the insulated glass assembly production. In the manufacturing of insulated glass, it is important to secure that the perimeter of a unit is completely sealed. If this is not done, the result is the ingress of moisture or debris which eventually leads to the premature degradation of an insulated glass assembly.

In view of this difficulty, the prior art has proposed numerous methods and various apparatus to ensure uniform application of sealant material in the assemblies. Typical of the known arrangements is extrusion heads which are either automated or manual. One of the primary difficulties of the known arrangements is that the depth of the sealant material cannot be uniformly applied in width or depth about the perimeter and further, the known arrangements are limited in that they do not positively avoid entrapment of air within the sealant material. A further limitation is that the most extreme perimeter of the sealant material cannot be perfectly perpendicular relative to the substrate surface. The result of this is, therefore, surface irregularity about the perimeter as opposed to a smooth planar finish which would be more desirable from an aesthetic point of view as well as a structural point of view.

Although apparatus has been developed in the past for handling insulating glass assemblies and applying sealant material to the edges, such apparatus has not been totally satisfactory. In one prior art system, a stationary header applies the sealant material to the glass assembly as it moves along a work support. However, one of the problems of such an arrangement is that it is difficult to keep the glass assembly and spacers properly aligned, relative to each other as it moves relative to the stationary header. As a result, defects in the seal are likely to occur.

In another prior art arrangement, the sealant material is applied to a frame formed by the aluminum spacers, and then the spacer frame with the sealant material applied thereto is taken to another station where the glass panels are adhered to the spacer frame. The glass assembly is then transferred to a vertically arranged heating and compression station to heat and compress the assembly. As will be understood, such an arrangement is time consuming, expensive, requires many work stations and is not automatic. Accordingly, this system has also not been entirely satisfactory.

In view of the existing limitations in the sealant applying art, there exists a need for an improved new method of disposing sealant between, for example, insulated glass assemblies. Further, there remains a need for an automated system for applying sealant material by a dispensing head that moves completely around the perimeter of the insulated glass assembly in a single continuous motion.

DESCRIPTION OF THE PRIOR ART

An apparatus for automatically applying sealant material in an insulated glass assembly of various designs, configurations, styles and materials of construction have been disclosed in the prior art. For example, U.S. Pat. No. 5,650,029 to LAFOND discloses a method for applying sealant material between spaced-apart substrates in an insulated glass assembly. The method of application of extrusion nozzles and smoothing plates. The smoothing plates move in concert with the extrusion nozzles to ensure the uniform distribution of the sealant material from the spacer to the perimeter of the substrates. The smoothing plates ensure a uniform and planar surface at the perimeter. This method of sealant material application to the insulated glass assembly is automated, and accordingly, the sealant material can be applied in an expedited manner with a high degree of precision of uniformity. This prior art patent does not disclose or teach the particular structure and design of the present invention for an automated system that automatically applies sealant material around the perimeter and between glass panes in an insulated glass assembly in a single continuous motion.

U.S. Pat. No. 4,826,547 to LENHARDT discloses a process and apparatus for applying a sealing mass to seal the space between panes of insulating glass using a sealing nozzle. The apparatus includes at least one sealing nozzle and at least one covering and stripping plate. The stripping plate permits the defect-free and bubble-free filling of panes of insulating glass with a sealing material, even in the corner areas, in a uniform manner. This prior art patent does not disclose or teach the particular structure and design of the present invention for an automated system that automatically applies sealant material around the perimeter and between glass panes in an insulated glass assembly in a single continuous motion.

U.S. Pat. No. 4,295,914 to CHECKO discloses an apparatus for applying sealant material to an insulated glass assembly. The apparatus includes a work supporting table for receiving the glass assembly, and an aligning apparatus for properly orienting and aligning the glass panels and spacers of the glass assembly relative to each other and relative to a sealant applying nozzle/head. The sealant applying apparatus also includes a clamping assembly having clamping members for clamping the glass assembly in order to maintain the glass assembly in its properly aligned position so that the sealant material can be applied to the space between the perimeter edges of the glass assembly. The sealant applying head is mounted for movement relative to an edge of the glass assembly which includes a nozzle assembly for applying the sealant material to the glass assembly as it moves relative to it. This prior art patent does not disclose or teach the particular structure and design of the present invention for an automated system that automatically applies sealant material around the perimeter and between glass panes in an insulated glass assembly in a single continuous motion.

U.S. Pat. No. 5,762,738 to Lafond discloses a method for applying sealant material between spaced-part substrates in an insulated glass assembly. The method of application is sequential and employs extrusion nozzles and smoothing plates. The smoothing plates move in concert with the extrusion nozzles to ensure the uniform distribution of the sealant material from the spacer to the perimeter of the substrates. The smoothing plates ensure a uniform and planar surface of the perimeter. This method of sealant material application to the insulated glass assembly is automated, and accordingly, the sealant material can be applied in an expedited manner with a high degree of precision and uniformity. This prior art patent does not disclose or teach the particular structure and design of an automated system for automatically applying sealant material around the perimeter in an insulated glass assembly in a single continuous motion.

U.S. Pat. No. 5,803,943 to Parsons discloses an apparatus for forming insulated glass structures. This apparatus is used for applying heat and pressure to form the glass assembly and is composed of a pair of glass sheets having a spacer and sealant inserted therebetween. The apparatus includes a rigid frame assembly having a plurality of torsion bars being pivotably mounted thereto. The apparatus also includes an aluminum lower platen resting in a plurality of pistons capable of raising and lower the lower platen, and includes an upper platen fixedly attached to the frame supports and substantially parallel to the lower platen. The apparatus further includes a heating element for heating the lower platen and the space between the lower and upper platens, respectively, and a control panel for operating the apparatus. The preheated heating elements cause the glass sheets to be compressed between the platens and are heated such that the spacer sealant is cured and the insulated glass assembly is formed. This prior art patent does not disclose or teach the particular structure and design of an automated system for automatically applying sealant material around the perimeter in an insulated glass assembly in a single continuous motion.

U.S. Pat. No. 5,876,554 to Lafond discloses an apparatus for sealing the corners of an insulated glass assembly and spacer material for use in either a manual or an automated production assembly. The apparatus includes a pair of wiper blocks each having an interior surface for abutting an edge of the glass assembly and are arranged in a substantially perpendicular configuration to each other. The wiper blocks are adapted for converging and diverging in a reciprocal movement from an adjoining position for molding a square corner of glass assembly to a separated position for wiping smooth the surface of the injected sealant material. The apparatus further includes a nozzle which is positioned between the wiper blocks for injecting sealant material into the corner area and retracting in concert with the converging movement of the wiper blocks, respectively. This prior art patent does not disclose or teach the particular structure and design of an automated system for automatically applying sealant material around the perimeter in an insulated glass assembly in a single continuous motion.

U.S. Pat. No. 5,932,062 to Manser discloses an automated sealant applicator for applying sealant material to form a plurality of insulated glass assemblies. The apparatus includes a computer control and a support structure having a carriage on which is movably disposed a sealant applicator. The sealant applicator is selectively positionable along at least one axis via the computer control and one or more sensors operate to provide the computer control with data regarding sealant application as the sealant is applied. The computer control is further operative to both determine the depth of sealant to be applied, and to effect positioning of the sealant applicator in response to data from the one or more sensors such that sealant applied does not exceed the determined depth. This prior art patent does not disclose or teach the particular structure and design of an automated system for automatically applying sealant material around the perimeter in an insulated glass assembly in a single continuous motion.

U.S. Pat. Nos. 4,110,148; 4,145,237; 4,561,929; and 4,711,692 disclose other apparatus for sealing the edges of an insulated glass assembly with a sealant or adhesive material.

None of the aforementioned prior art patents disclose or teach an automated system or an overall apparatus for automatically and continuously applying sealant material to an insulated glass assembly having a motorized-dispensing nozzle that moves completely around the perimeter of the insulated glass assembly in a single continuous motion, with the insulated glass assembly being in a fixed position and held in place by suction during the sealing process by the use of an air float and suction system. Further, none of these prior art patent disclose or teach that the insulated glass assembly is moved forward within the apparatus by the air floats when the sealant material has been completely dispensed within the insulated glass assembly.

Accordingly, it is an object of the present invention to provide an improved apparatus for automatically and continuously applying sealant material in a single continuous motion along the perimeter of an insulated glass unit assembly.

Another object of the present invention is to provide an automated system for applying sealant material that is built in a horizontal plane with the dispensing head traveling on an X-Y slide assembly, with the starting corner being in the rear left.

Another object of the present invention is to provide an automated system for applying sealant material that has the insulated glass assembly in a fixed position and held in place by suction during the sealing process with the use of an air float and suction system.

Another object of the present invention is to provide an automated system for applying sealant material that has a dispensing head which moves completely around the perimeter of the insulated glass assembly in a single continuous motion.

Another object of the present invention is to provide an automated system for applying sealant material that has the insulated glass assembly moving forward by the use of air floats when the sealant material has been completely dispensed within the insulated glass assembly.

Another object of the present invention is to provide an automated system for applying sealant material that automatically changes its alignment criteria for different sizes of air spaces, and allows for differences in the sealant space caused by improper positioning of the spacer when manufacturing the insulated glass assembly.

Another object of the present invention is to provide an automated system for applying sealant material that works for different sizes, shapes and thicknesses of glass units, with the benefit of increased efficiency due to lower maintenance and labor costs during change-overs for different sizes, shapes or thicknesses of the insulated glass assembly.

Another object of the present invention is to provide an automated system for applying sealant material that utilizes an integrated electric system which automatically adjusts for the glass unit thickness chosen, thereby effectively eliminating operator error and variations for the different glass unit thicknesses of the insulated glass assembly being produced.

Another object of the present invention is to provide an automated system for applying sealant material in an insulated glass assembly that minimizes down time and labor costs by enabling quick removal of jams, defective glass units or misapplied sealant materials to the glass unit during the operational use of the apparatus.

Another object of the present invention is to provide an automated system for applying sealant material in an insulated glass assembly that minimizes change-over time and set-up time by automatically and simultaneously adjusting the position of the dispensing nozzle head in regard to the glass units being processed.

A further object of the present invention is to provide an automated system for applying sealant material in an insulated glass assembly that is simply to manufacture and assemble and is also more cost efficient during operational use.

SUMMARY OF THE INVENTION

In accordance with the present invention, there is provided an apparatus for applying sealant material continuously to an insulated glass panel assembly having a spacer frame with first, second, third and fourth perimeter edges and corners defining a sealing area for receiving sealant material therein. The apparatus includes a swivel dispensing head assembly (500) having a dispensing nozzle (502) thereon for applying sealant material in a continuous motion to the sealing area of the first, second, third and fourth perimeter edges of the spacer frame of the insulated glass panel assembly. The swivel dispensing head assembly (500) includes a swivel rotation member sub-assembly (510) for swiveling and rotating the dispensing nozzle (502) around each of the first, second, third and fourth corners of the spacer frame of the insulated glass panel assembly, wherein the dispensing nozzle applies the sealant material within the sealing area of the spacer frame; and also includes a dispensing valve sub-assembly (530) for transferring and controlling the flow movement of the sealant material from a sealant material drum via a material supply hose to the dispensing nozzle.

The apparatus also includes a dispensing head rotation assembly (400) for rotating the swivel dispensing head assembly (500) and the dispensing nozzle (502), as the dispensing nozzle applies the sealant material around each of the first, second, third and fourth corners of the spacer frame of the insulated glass panel assembly. The apparatus further includes a slide assembly for moving the dispensing head rotation assembly (400) around the first, second, third and fourth perimeter edges of the spacer frame of the insulated glass panel assembly during the sealing operation.

The apparatus additionally includes a frame assembly having a frame housing with an air float tabletop thereon; the air float tabletop includes an upper wall surface, a bottom wall surface and a plurality of air and vacuum hole openings therethrough for supplying either air or vacuum to the upper wall surface of the air float tabletop; and a glass air float and suction assembly having a plurality of air hose members for supplying air to support and float the insulated glass panel assembly above the upper wall surface of the air float tabletop in order to properly position the insulated glass panel assembly relative to the frame assembly prior to the sealing operation, and for removal of the insulated glass panel assembly after the sealing operation has been completed; and for supplying suction to clamp the insulated glass panel assembly on the upper wall surface of the air float tabletop in order to properly position the insulated glass panel assembly during the sealing operation.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

Overview

Figure 1:
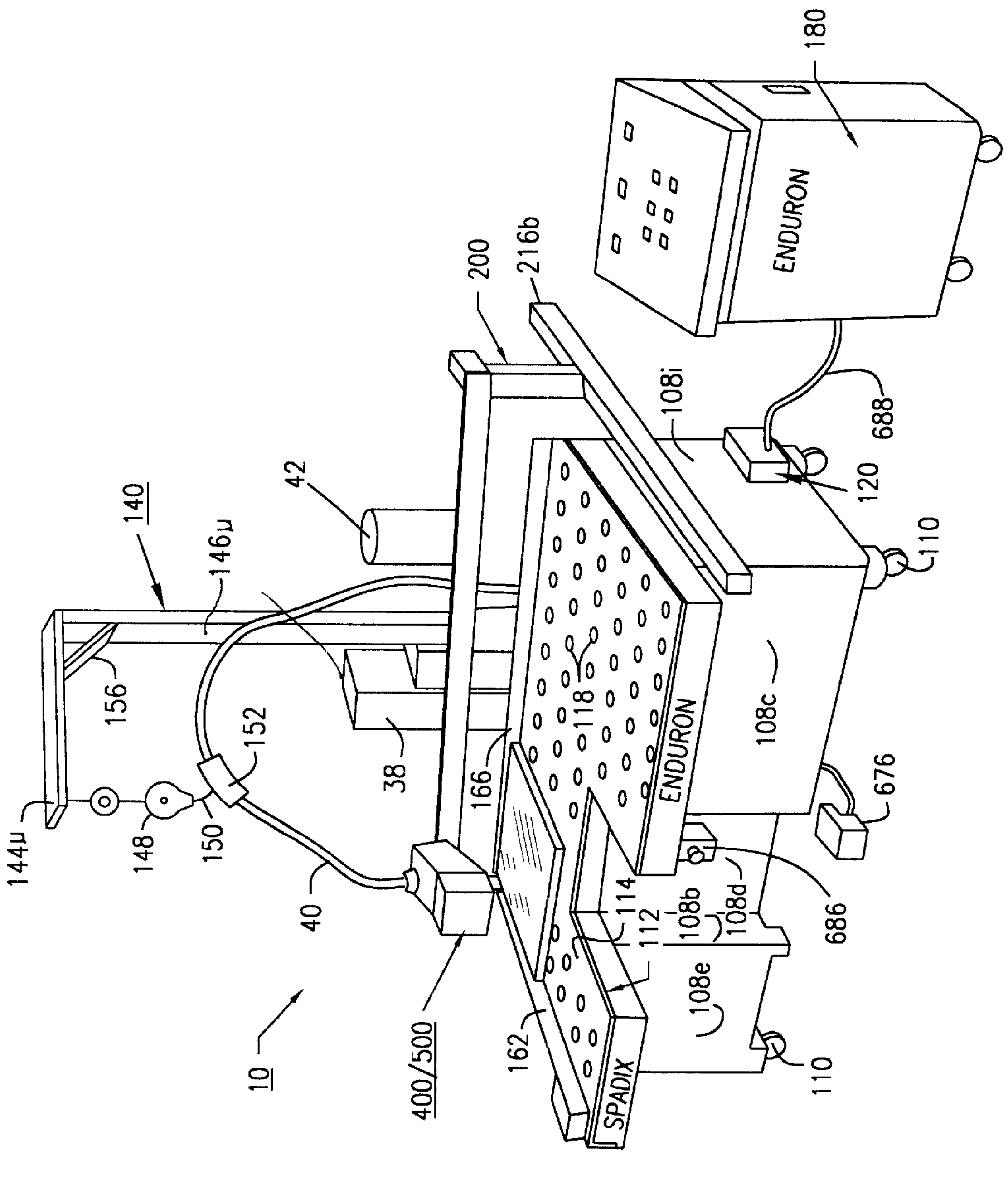
FIG. 1 is a front perspective view of the automated glass sealing apparatus of the preferred embodiment of the present invention showing the major component assemblies contained therein and in operational use.

The automated glass sealing apparatus 10 and its component assemblies of the preferred embodiment of the present invention are represented in detail by FIGS. 1 through 20 of the patent drawings. The automated glass sealing apparatus 10 is used for automatically applying sealant material 12 in an insulated glass assembly 14 consisting of at least two panels or panes of glass 16 and 18 separated by a metal or plastic spacer frame 20 having a first side 22, a second side 24, a third side 26 and a fourth side 28. More particularly, the sealant material 12 is evenly applied within the sealing area 30 of the spacer 20 to form an air space 32 between glass panels 16 and 18 such that the dispensing nozzle 502 of the swivel dispensing head assembly 500 precisely dispenses the sealant material 12 around the perimeter sealing area 30 with no excess sealant material 12 therebetween, thereby eliminating a need for a wiper device to remove any excess sealant material 12 from the spacer 20.

The automated glass sealing apparatus 10 of the present invention, as shown in FIGS. 1 to 20 of the drawings, comprises a frame assembly 100; a slide assembly 200; a glass air float and suction assembly 300; a dispensing head rotation assembly 400; a swivel dispensing head assembly 500; an electronic control system 600; and an electro-pneumatic control system 700. This apparatus 10 provides a novel and unique method for holding the glass panel 14 in place via the glass air float and suction assembly 300, and for applying the sealant material 12 by a swivel dispensing head assembly 500 that moves completely around the perimeter sides 22, 24, 26 and 28 of the insulated glass assembly 14 in a single continuous motion having no excess sealant material 12 within the sealing areas 30.

Frame Assembly 100

Figure 2:
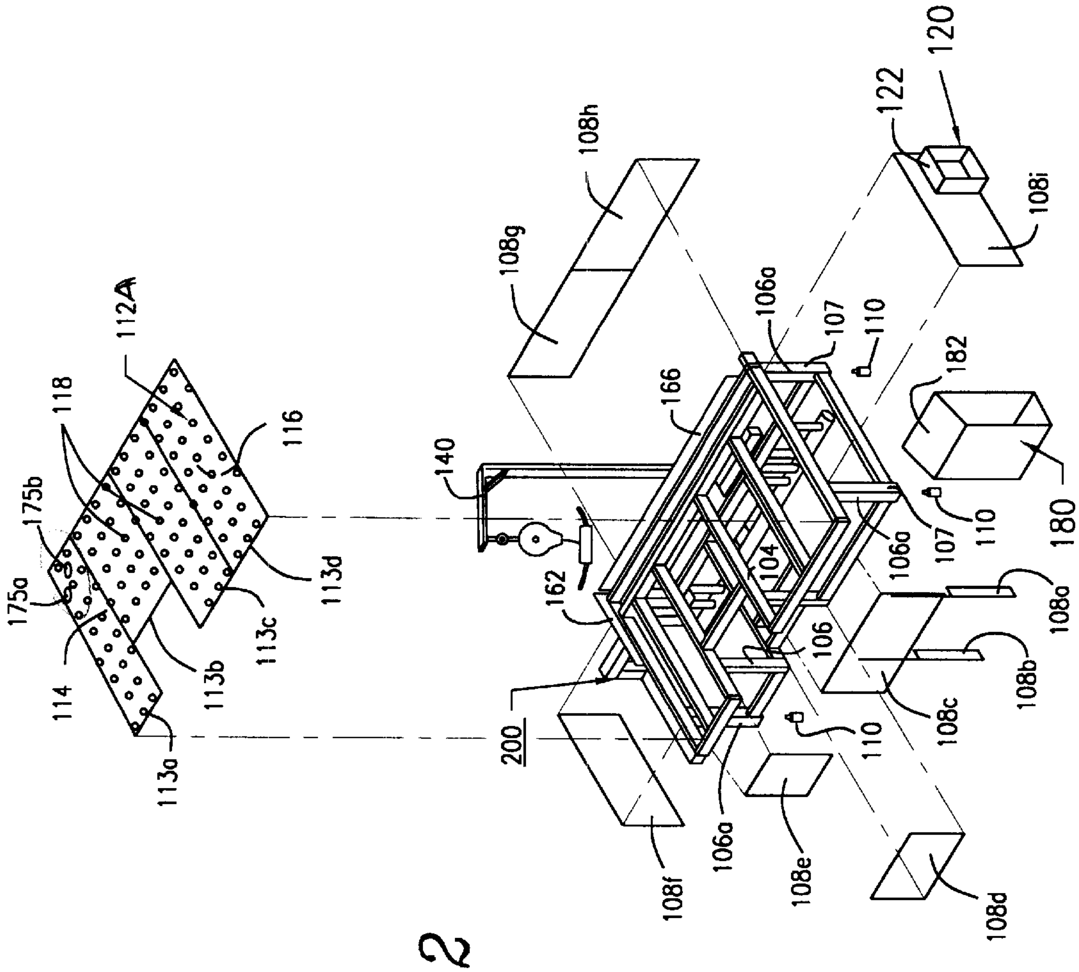
FIG. 2 is a partially exploded front perspective view of the automated glass sealing apparatus of the present invention showing the frame assembly and its component parts contained therein and in an assembled state.
Figure 3:
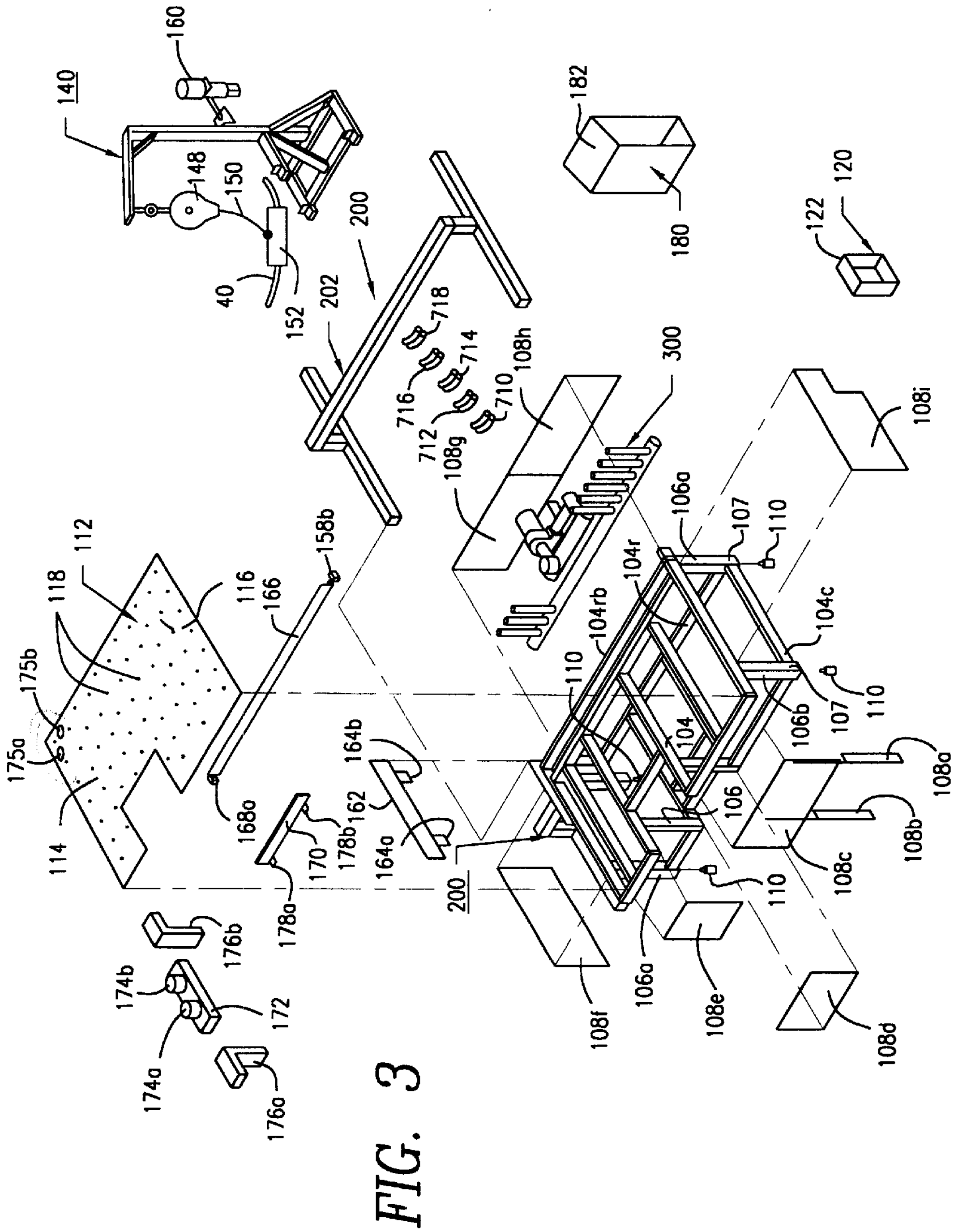
FIG. 3 is an exploded front perspective view of the automated glass sealing apparatus of the present invention showing the frame assembly and its component parts contained therein and in an unassembled state.
Figure 9:
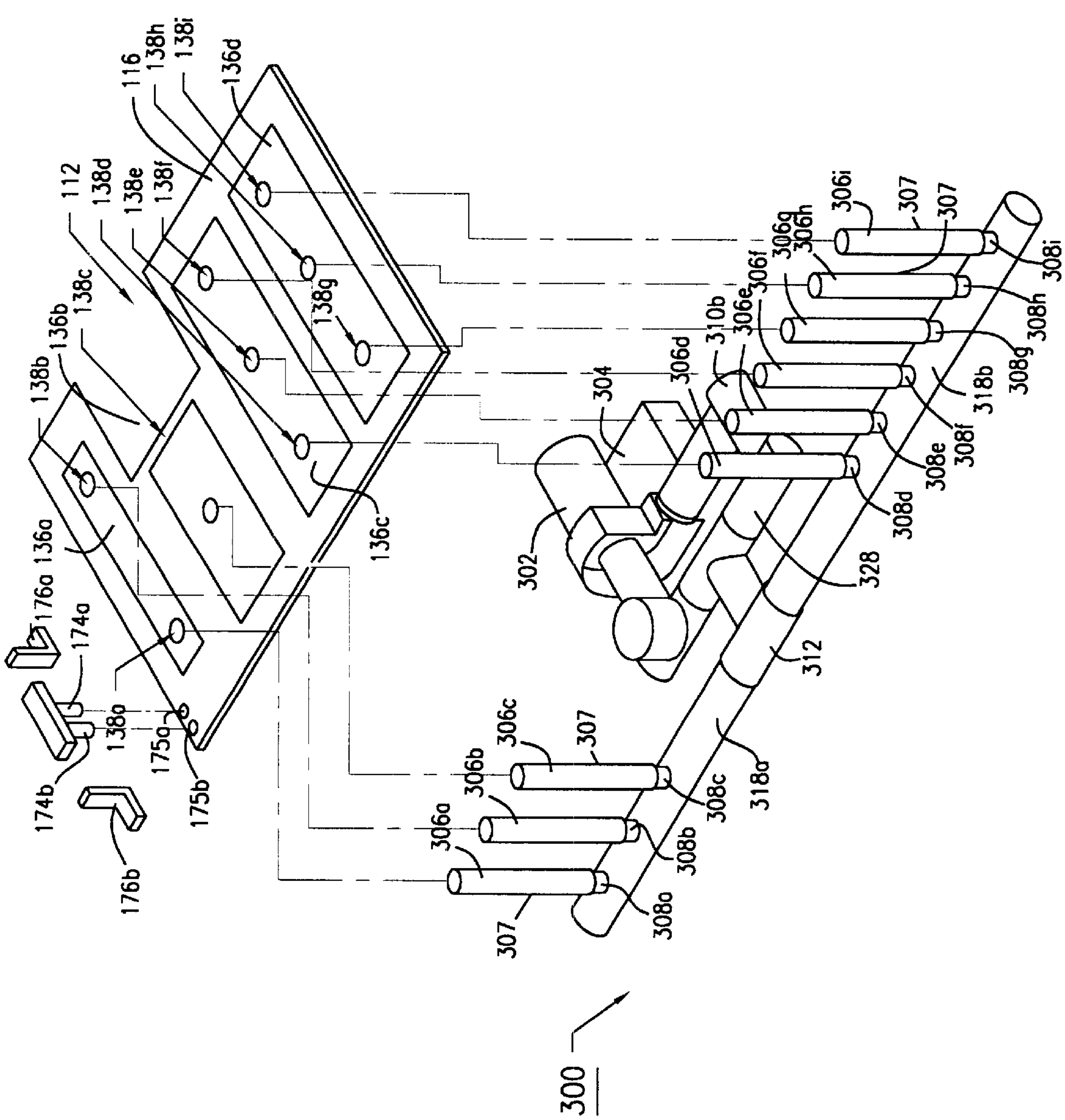
FIG. 9 is a partially exploded perspective view of the automated glass sealing apparatus of the present invention showing the bottom wall surface of the tabletop having a plurality of air reservoir pans thereon and the glass air float and suction assembly.

The frame assembly 100, as depicted in detail by FIGS. 1, 2, 3, 9, 17, 18 and 19, is used for the precise holding, housing and placement of the various major assemblies including the slide assembly 200 and the glass air float and suction assembly 300. The frame assembly 100 is substantially rectangular in shape and provides for the mounting and interaction of the hose support sub-assembly 140, the slide assembly 200 and the glass air float and suction assembly 300 of the automated glass sealing apparatus 10. The frame assembly 100 includes a plurality of horizontal bar members 104 and vertical bar members 106 integrally connected in a predetermined manner to form a frame housing 102, as shown in FIGS. 2 and 3 in order to accommodate the aforementioned assemblies 140,200 and 300. The horizontal and vertical bar members 104 and 106 are made of steel channel (hollow) rods that are welded together in the aforementioned predetermined manner to form frame housing 102. Frame housing 102 includes a plurality of side panel covers 108*a* to 108*i* for enclosing the substantially rectangular-shaped frame housing 102 of frame assembly 100. Frame housing 102 further includes a plurality of frame levelers 110 connected at the lower end 107 of each vertical bar member 106*a* in order to properly level apparatus 10 to a horizontal position when in operational use. Frame housing 102 also includes a steel or plastic composite air float tabletop 112 being mounted on a plurality of horizontal bar members 104*t*, as shown in FIGS. 2, 3 and 9 of the drawings. Tabletop 112 includes an upper top wall surface 114, and a bottom wall surface 116. Tabletop 112 also includes a plurality of air and vacuum hole openings 118 for supplying either air 34 or vacuum 36 to the upper top wall surface 114 of tabletop 112. Upper wall surface 114 of tabletop 112 is used for holding the lower/inner panel of glass 18 of the glass assembly 14 under vacuum 36 prior to and during the sealing operation. The air and vacuum hole openings 118 are evenly spaced-apart throughout the tabletop 112 for providing a sufficient amount of air 34 to float the insulated glass assembly 14 when moving it or for providing a sufficient amount of vacuum 36 to hold in place the insulated glass assembly 14 when the sealing operation is occurring. The bottom wall surface 116 of the air float tabletop 112 includes a plurality of attached air holding pans 136*a* to 136*d* for containing air 34 therein in which to evenly disperse the air 34 through the air hole openings 118 on the upper top wall surface 114 of air float tabletop 112. Each of the air holding pans 136*a* to 136*d* has one or more air hose connector ports 138*a* to 138*i* thereon for receiving the upper ends 307 of the plurality of air hose members 306*a* to 306*i*, respectively, thereto in order to receive air 34 from air blower 302, as shown in FIG. 9 of the drawings. Additionally, the air float tabletop 112 and 112A, as shown in FIGS. 2 and 3, can be made from a single section of metal or plastic composite, or from a plurality of metal or plastic composite sections 113*a*, 113*b*, 113*c* and 113*d*. Both of the air float tabletops 112 and 112A have the same component parts thereon, as shown in FIG. 9 of the drawings.

Figure 14:
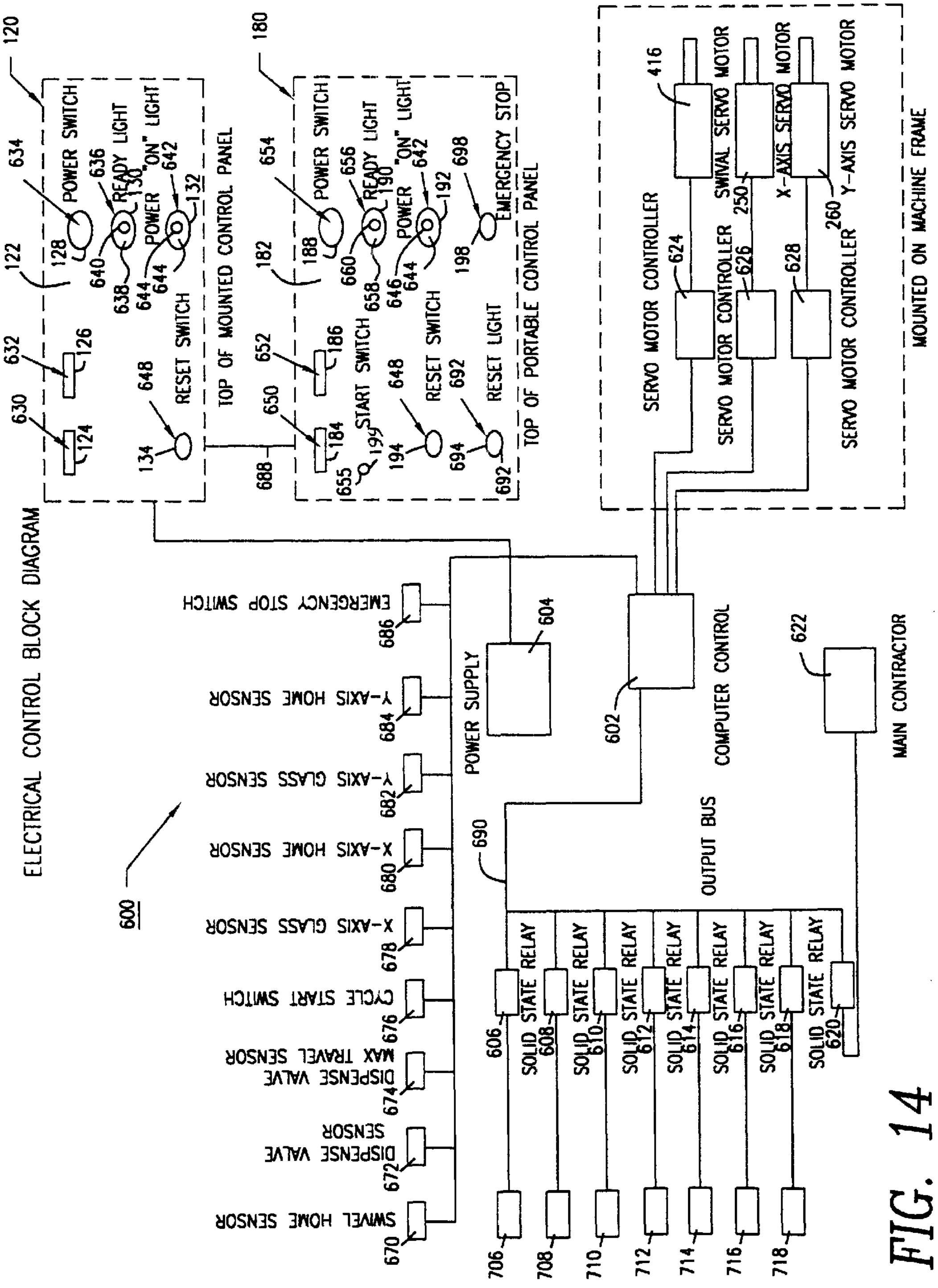
FIG. 14 is a schematic block diagram of the automated glass sealing apparatus of the present invention showing the electronic control system and its component parts contained therein.

Frame housing 102 additionally includes a mounted control panel box 120 being attached to a horizontal bar member 104*c*, as shown in FIGS. 1 and 14 of the drawings. The front outer wall 122 of the mounted control panel box 120 includes a first rectangular slot opening 124 for receiving therein a first heat controller button 630 to regulate the heat for the dispensing valve sub-assembly 530 of the swivel dispensing head assembly 500; and a second rectangular slot opening 126 for receiving therein a second heat controller button 632 to regulate the heat for the pressure compensator valve 160 of the hose support sub-assembly 140. Outer wall 122 of the mounted control panel box 120 further includes a first oval-shaped opening 128 for receiving a power switch/button 634 therein; a second oval-shaped opening 130 for receiving a light-bulb 640 and lens 638 for forming a ready light 636 thereon; a third oval-shaped opening 132 for receiving a light-bulb 646 and lens 644 for forming a power-on light 642; and a fourth oval-shaped opening 134 for receiving a reset switch/button 648 therein.

Figure 4:
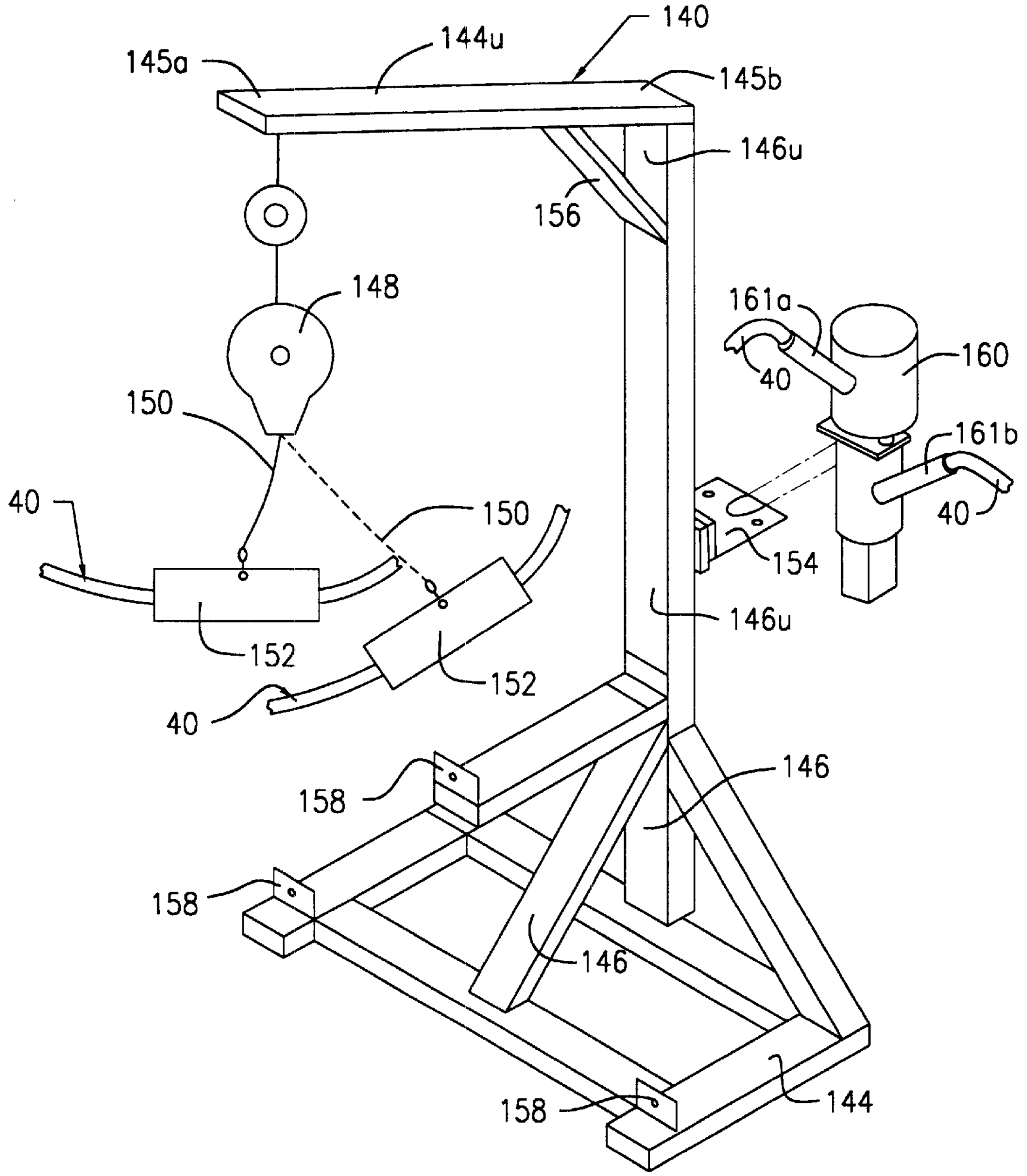
FIG. 4 is a front perspective view of the automated glass sealing apparatus of the present invention showing the hose support sub-assembly and its component parts contained thereon and in operational use thereof.

Additionally, frame housing 102 also includes a hose support sub-assembly 140 being used to support the material supply hose 40 attached to the heated sealant material drum 42, such that the material supply hose 40 is suspended above the upper wall surface 114 of tabletop 112, as depicted in FIGS. 1, 3 and 4 of the drawings. Hose support sub-assembly 140 includes a hose support frame 142 formed from a plurality of welded together horizontal and vertical bar members 144 and 146, respectively. Hose support frame 142 includes an upper horizontal bar member 144*u* having at one end 145*a* a hose support coil spring 148 having a retractable and expandable wire 150 with an attached hose clamp holder 152 thereon, and having at the other end 145*b* a vertical bar member 146*u* with a connecting support bar member 156 attached therebetween. Hose clamp holder 152 is used to secure and clamp the material supply hose 40 above the tabletop surface 114. Hose support coil spring 148 and hose clamp holder 152 are used in conjunction with each other to support the material supply hose 40 above the upper tabletop surface 114, as well as the retractable wire 150 of the hose support coil spring 148 expands to allow movement of the material supply hose 40 as the dispensing valve sub-assembly 530 of the swivel dispensing head assembly 500 travels along the perimeter of the upper tabletop surface 114. Vertical bar member 146*u* includes a valve bracket 154 attached thereto for holding in place the pressure compensator valve 160 thereon. The lower horizontal bar members 144*l* include a plurality of connecting brackets 158 for attaching to one or more rear horizontal bar members 104*r* via screws or rivets 168 in which to attach the hose support sub-assembly 140 to that of the frame housing 102 of frame assembly 100, as depicted in FIGS. 3 and 4 of the drawings.

Figure 20:
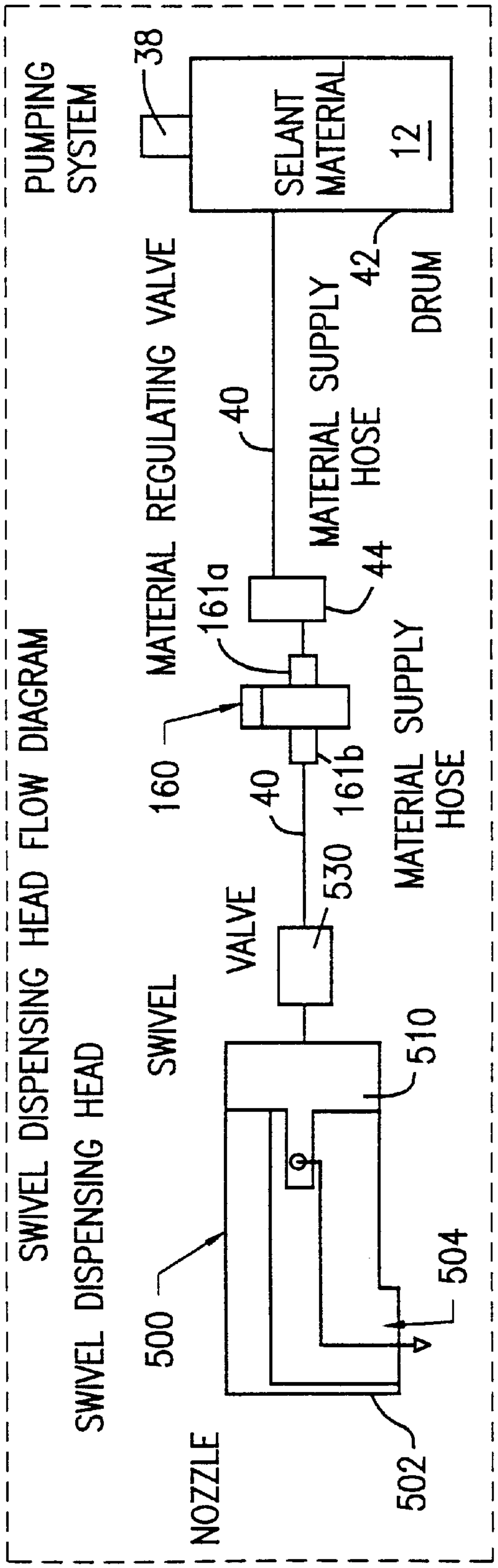
FIG. 20 is a schematic diagram of the automated glass sealing apparatus of the present invention showing the sealant material flow from the sealant material drums through the swivel dispensing head assembly in which to extrude sealant material from the dispensing nozzle.

The pressure compensator valve 160 is used to adjust the sealant material flow 12 via heat or pressure through dispensing valve sub-assembly 530. Pressure compensator valve 160 includes an inlet hose connector 161*a* and an outlet hose connector 161*b*. Inlet hose connector 161*a* supplies the unregulated material flow of sealant material 12 from the pumping system 38 to pressure compensator valve 160, and outlet hose connector 161*b* supplies the regulated material flow (heat and/or pressure) of the sealant material 12 from the pressure compensator valve 160 to the dispensing valve sub-assembly 530, as depicted in FIGS. 4 and 20 of the drawings.

Frame housing 102 further includes a left glass guide device 162 being used to position the left side 22 of the insulated glass assembly 14 in its proper position prior to the sealing operation; and a back glass guide device 166 being used to position the back side 24 of the insulated glass assembly 14 in its proper position prior to the sealing operation, respectively. The left glass guide device 162 is attached to an upper horizontal bar member 104*ta* via attachment brackets 164*a* and 164*b* of frame housing 102. The back glass guide device 166 is also attached to a rear upper horizontal bar member 104*tb* via a pair of pillow block bearings 168*a* and 168*b* of frame housing 102.

Additionally, frame housing 102 also includes a rear glass clamp 170 having a pair of mounting brackets 178*a* and 178*b* thereon for holding the insulated glass panel assembly 14 in place on the upper wall surface 114 of the air float tabletop 112 while sealing the left, front and right sides 22, 28 and 26, respectively, of spacer frame 20 with sealant material 12. Rear glass clamp 170 is attached to the back glass guide device 166 by means of the mounting brackets 178*a* and 178*b* thereto, as shown in FIGS. 1 and 3. Further, frame housing 102 includes a suction cup slide 172 having suction cups 174*a* and 174*b* thereon and having attachment brackets 176*a* and 176*b* thereon. Suction cups 174*a* and 174*b* are mounted on the suction cup slide 172, such that the suction cups 174*a* and 174*b* are used for holding a smaller insulated glass panel assembly 14 more firmly to the upper wall surface 114 of the air float tabletop 112. Suction cup slide 172 allows for some movement so that the suction cups 174*a* and 174*b* can squeeze onto the inner panel of glass 18 in which to more firmly hold the entire insulated glass panel assembly 14 in place on tabletop surface 114 of the air float tabletop 112 during the sealing operation. As shown in FIGS. 2, 3 and 9 of the patent drawings, suction cup slide 172 is attached to the bottom wall surface (underside) 116 of air float tabletop 112 by means of attachment brackets 176*a* and 176*b*, such that the suction cups 174*a* and 174*b* protrude through suction cup openings 175*a* and 175*b*, respectively, of the upper top wall surface 114 of air float tabletop 112. Frame housing 102 also includes the holding and placement of solenoids 710, 712, 714, 716 and 718 on a horizontal bar member 104, as shown in FIG. 3 of the drawings.

Figure 15:
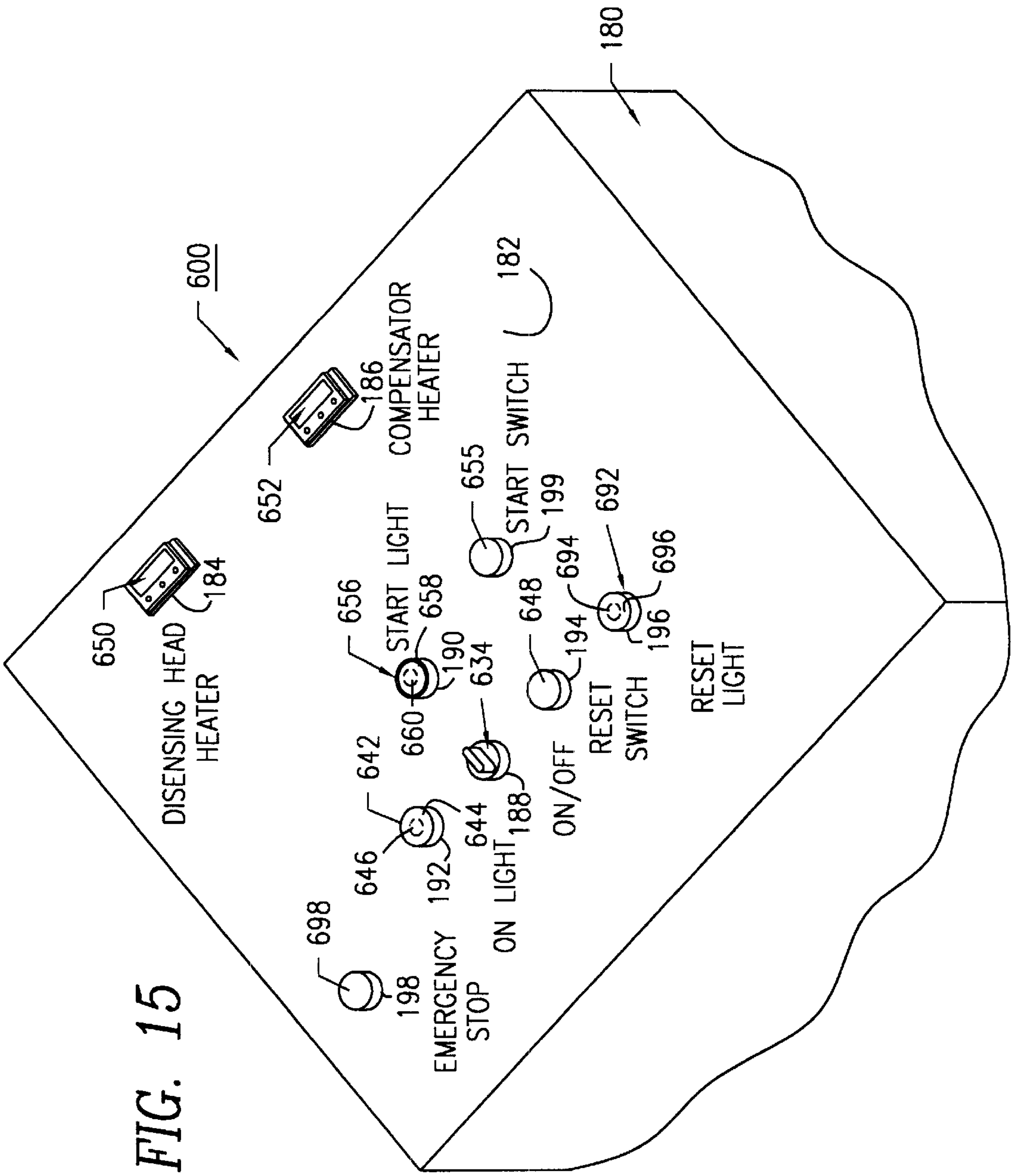
FIG. 15 is a front perspective view of the automated glass sealing apparatus of the present invention showing the portable and movable control panel box and its component parts contained therein.

Alternatively, frame housing 102 can include an additional movable/portable control panel box 180 being electrically connected to the fixed and mounted control panel box 120 via electrical line 688, as shown in FIGS. 1, 14 and 15 of the drawings. The front outer wall 182 of the mounted control panel box 180 includes a first rectangular slot opening 184 for receiving therein a first heat controller button 650 to regulate the heat for the dispensing valve sub-assembly 530 of the swivel dispensing head assembly 500; and a second rectangular slot opening 186 for receiving therein a second heat controller button 652 to regulate the heat for the pressure compensator valve 160 of the hose support sub-assembly 140. Outer wall 182 of the portable control panel box 180 further includes a first oval-shaped opening 188 for receiving a power switch/button 654 therein; a second oval-shaped opening 190 for receiving a light bulb 660 and lens 658 for forming a ready light 656 thereon; a third oval-shaped opening 182 for receiving a light bulb 666 and lens 664 for forming a power-on light 662; and a fourth oval-shaped opening 194 for receiving a reset switch/button 668 therein. Additionally, outer wall 182 of the portable control panel box 180 also includes a fifth oval-shaped opening 196 for receiving a light bulb 696 and lens 694 for forming a reset light 692; a sixth oval-shaped opening 198 for receiving an emergency stop button 698;

and a seventh oval-shaped opening 199 for receiving a start button 655 therein.

Slide Assembly 200

Figure 5:
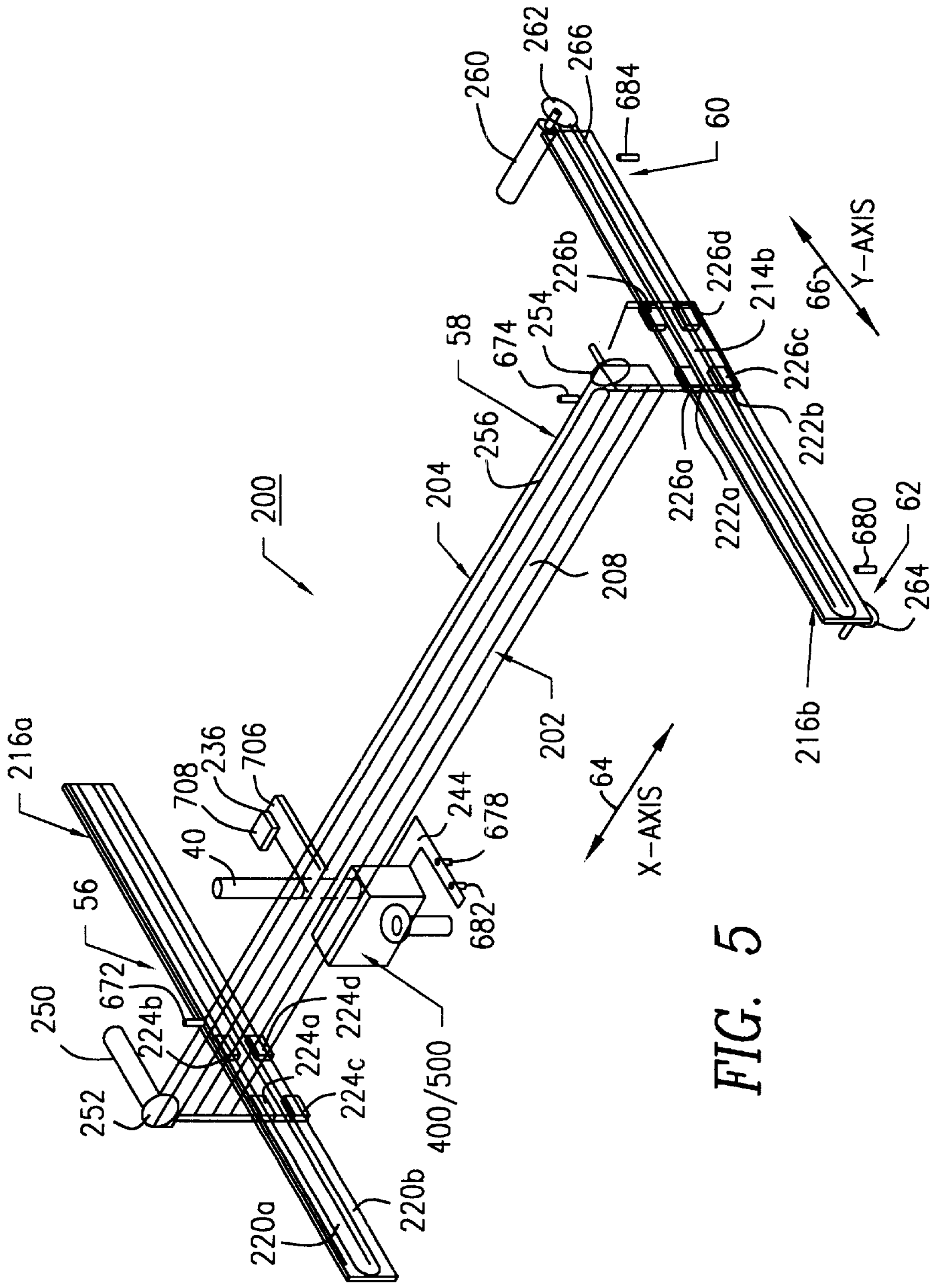
FIG. 5 is a front perspective view of the automated glass sealing apparatus of the present invention showing the slide assembly and its component parts contained therein and in an assembled state.
Figure 6:
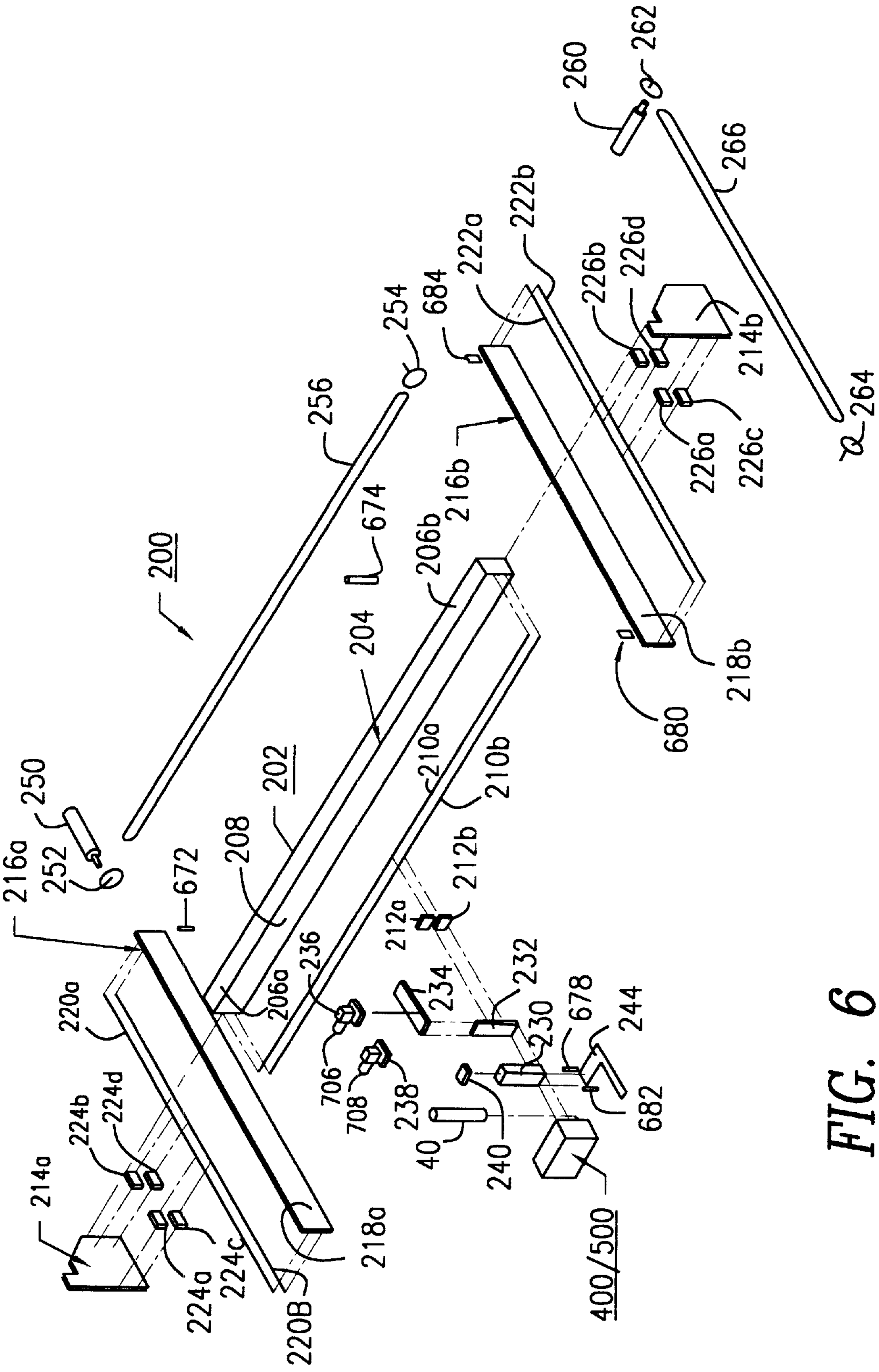
FIG. 6 is an exploded front perspective view of the automated glass sealing apparatus of the present invention showing the slide assembly and its component parts contained therein and in an unassembled state.
Figure 7:
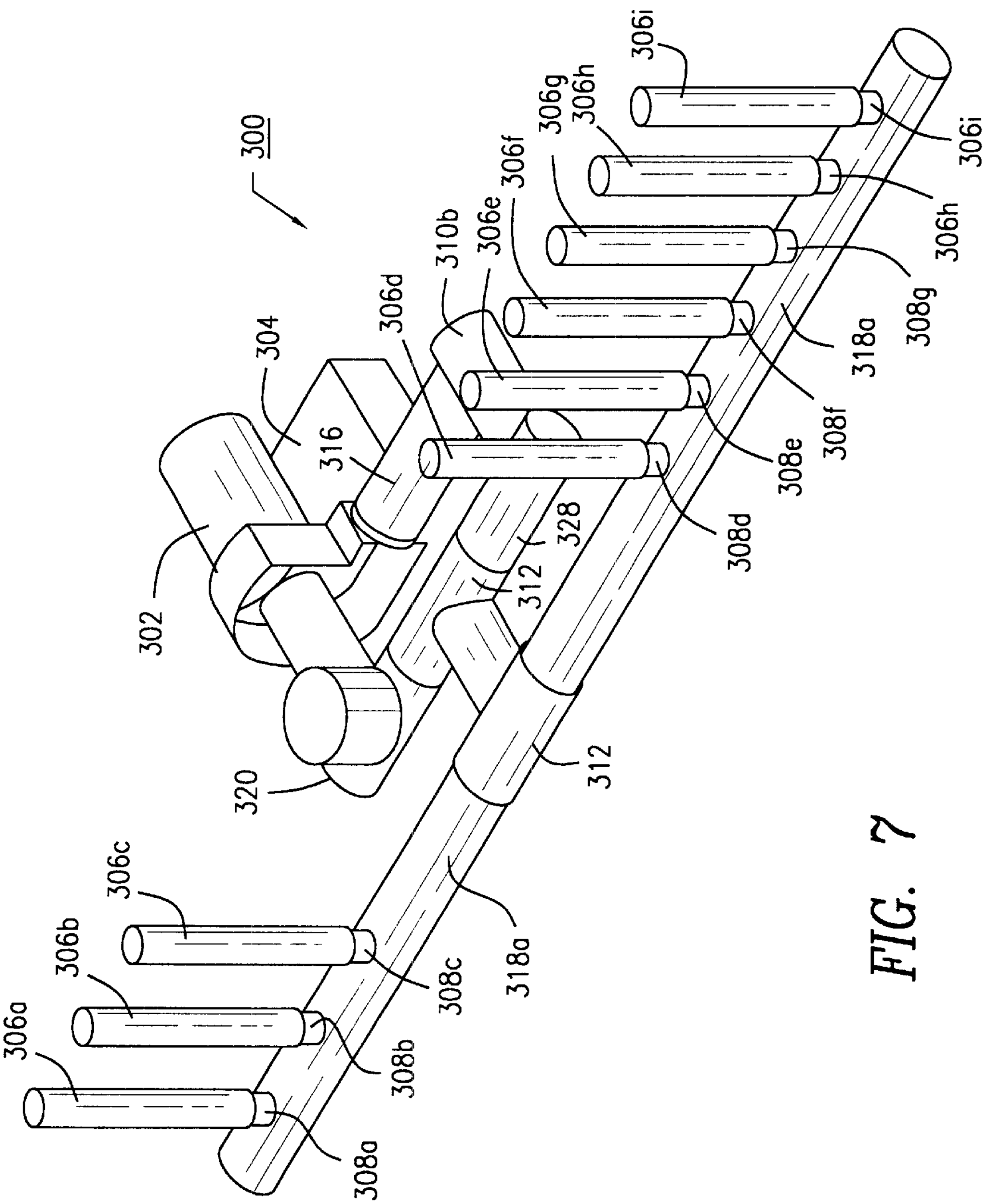
FIG. 7 is a front perspective view of the automated glass sealing apparatus of the present invention showing the glass air float and suction assembly and its component parts contained therein and in an assembled state.
Figure 8:
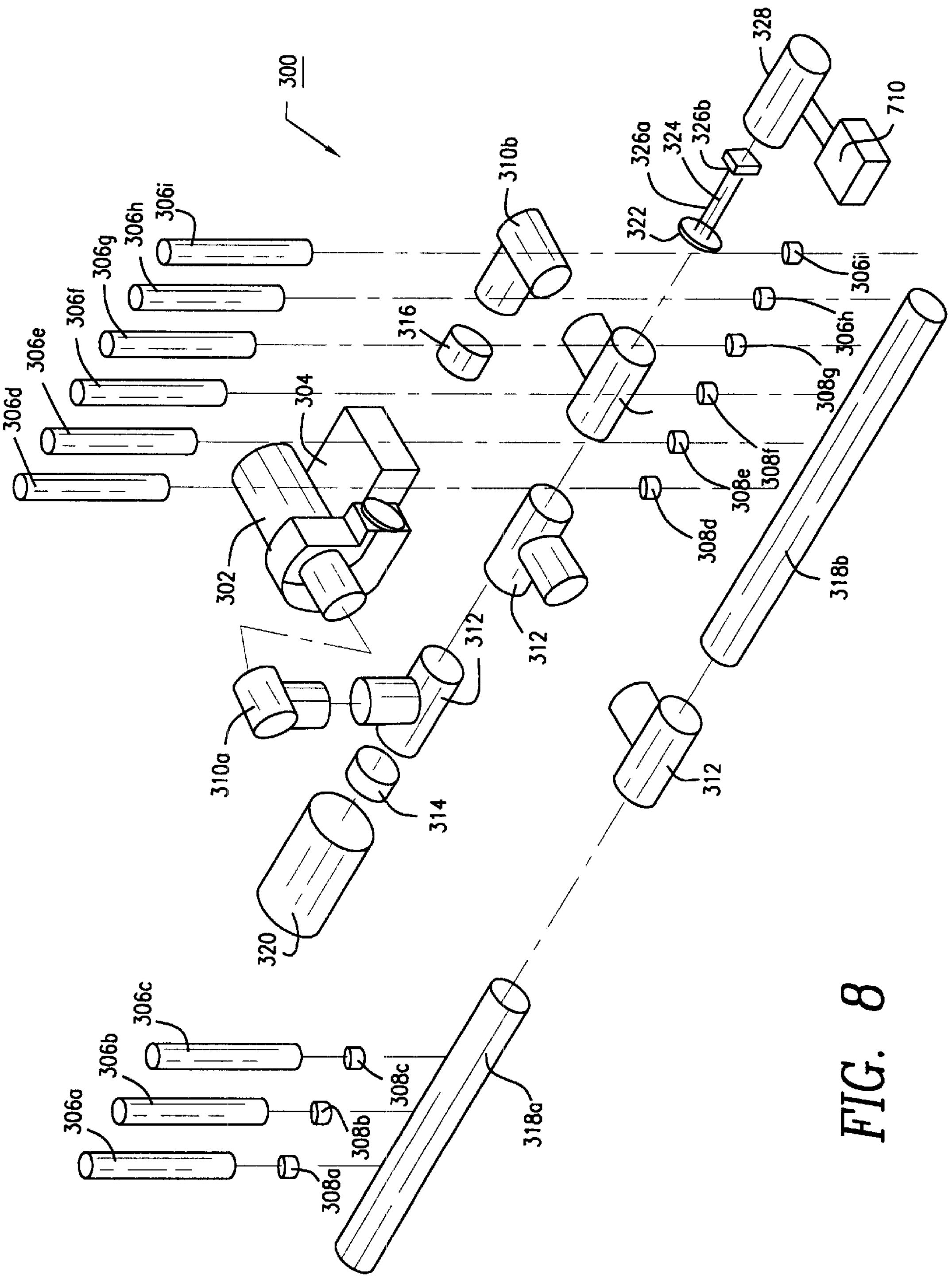
FIG. 8 is an exploded front perspective view of the automated glass sealing apparatus of the present invention showing the glass air float and suction assembly and its component parts contained therein and in an unassembled state.

The slide assembly 200, as shown in FIGS. 1, 3, 5, 6, 18 and 19 of the drawings, is used for positioning the dispensing head rotation assembly 400 around the perimeter sides 22, 24, 26 and 28 of the insulated glass panel assembly 14 during the sealing operation. The slide assembly 200 includes a substantially H-shaped frame 202 having a center head slide tube 204 and a pair of center slide plates 214*a* and 214*b* connected at each end 206*a* and 206*b* of the center head slide tube 204. Center slide plates 214*a* and 214*b* are used to mount the x-axis center head slide tube 204 to the y-axis lower slide plates 216*a* and 216*b*, respectively, as depicted in FIGS. 5 and 6 of the drawings. Head slide tube 204 is a hollow rectangular tube and includes an outer wall surface 208 having a pair of x-axis slide bars 210*a* and 210*b* mounted thereon, wherein slide bars 210*a* and 210*b* each have an x-axis slide roller (bearings) 212*a* and 212*b* slidably attached thereto, respectively. The x-axis slide rollers/bearings 212*a* and 212*b* are used to mount the piston holding plate or mounting bracket 232 to the slide bars 210*a* and 210*b*, respectively.

Each of the y-axis lower slide plates 216*a* and 216*b* include an outer wall surface 218*a* and 218*b* having a pair of y-axis slide bars 220*a* and 220*b*; and 222*a* and 222*b* mounted thereon, respectively. Y-axis slide bars 220*a* and 220*b* each have a pair of upper y-axis slide rollers/bearings 224*a* and 224*b*, and a pair of lower y-axis rollers/bearings 224*c* and 224*d* slidably attached thereto, respectively; and y-axis slide bars 222*a* and 222*b* each have a pair of upper y-axis slide rollers/bearings 226*a* and 226*b*, and a pair of lower y-axis rollers/bearings 226*c* and 226*d* slidably attached thereto, respectively.

Slide assembly 200 further includes a vertical head slide piston 230 having a dispense slide mechanism 238 being actuated by a dispense slide valve 236 for use as pneumatic slide assembly in order to control the height or z-axis of the dispensing head rotation assembly 400 and the swivel dispensing head assembly 500; a piston mounting bracket 232 for use in mounting the head slide piston 230 to the x-axis slide rollers/bearings 212*a* and 212*b*; and a solenoid mounting bracket 234 for use in mounting both of the dispense valve solenoid 706 and the dispense slide solenoid valve 708 to the piston mounting bracket 232. Dispense valve solenoid 706 is for controlling the operational use of the trigger piston 538 of dispensing valve sub-assembly 530. Solenoid valve 708 is for controlling the operational use of the vertical head slide piston 230 and both of the dispensing head rotation assembly 400 and the swivel dispensing head assembly 500. Slide assembly 200 also includes height adjuster block 240 for use in adjusting the height of the sealing dispensing nozzle 502 and correctly position the sealing dispensing nozzle 502 within the sealing area 30 of the glass panels 16 and 18 properly; a pair of glass sizing sensors 678 and 682 for use in sensing the position of the right side 26 and front side 28 of the insulated glass panel assembly 14; and a glass sizing sensor mounting bracket 244 for use in mounting the pair of glass sizing sensors 678 and 672 thereon.

Glass Air Float and Suction Assembly 300

The glass air float and suction assembly 300, as depicted in FIGS. 3, 7, 8, 9, 18 and 19 of the drawings, is used for supplying the air 34 to float the glass panel assembly 14 above the upper top wall surface 114 of tabletop 112, as well as for clamping the glass panel assembly 14 by suction/vacuum 36 to the upper top wall surface 114 of tabletop 112 when the air directional piston 322 is switched over from a pressurized air flow 34 to a vacuum 36 or suction mode. The glass air float and suction assembly 300 includes an air blower 302 for supplying air 34 needed to float the glass panel assembly 14; a blower stand 304 for housing and supporting the air blower 302; and a plurality of air hose members 306*a* and 306*i* for supplying air 34 or vacuum/suction 36 to the upper tabletop surface 114 being correspondingly connected to connector pipes 308*a* to 308*i*, respectively. Glass air float and suction assembly 300 further includes a plurality of other piping joints and pipe members 310*a*, 310*b*, 312*a* to 312*e*, 314, 316, 318*a* and 318*b* for supplying of the air 34 or vacuum 36 from the air blower 302 to the plurality of air hoses 306*a* to 306*i*; and an air filter member 320 for filtering the air 34 going into the assemble 300. The upper ends 307 of air hose members 306*a* to 306*i* are connected to the air hose connector ports 138*a* to 138*i* within air holding pans 136*a* to 136*d*, respectively, thereto, in order to supply air 34 to each of the air holding pans 136*a* to 136*d* from air blower 302, as depicted in FIG. 9 of the drawings. Glass air float and suction assembly 300 also includes an air directional piston 322 for changing the air flow 34 from a pressure mode (to float the glass panel assembly 14) to a suction or vacuum 36 mode (to clamp the glass panel assembly 14); a piston rod 324 having a first end 326*a* connected to the air directional piston 322 and a second end 326*b* connected to the piston air cylinder 328. The piston air cylinder 328 is used for moving of the air directional piston 322 when changing from a positive air flow 34 to a negative air flow of a vacuum 36. Glass air float and suction assembly 300 further includes a blower valve solenoid 710 for controlling the piston air cylinder 328 in order to have either a positive air flow 34 or vacuum 36.

Dispensing Head Rotation Assembly 400

Figure 10:
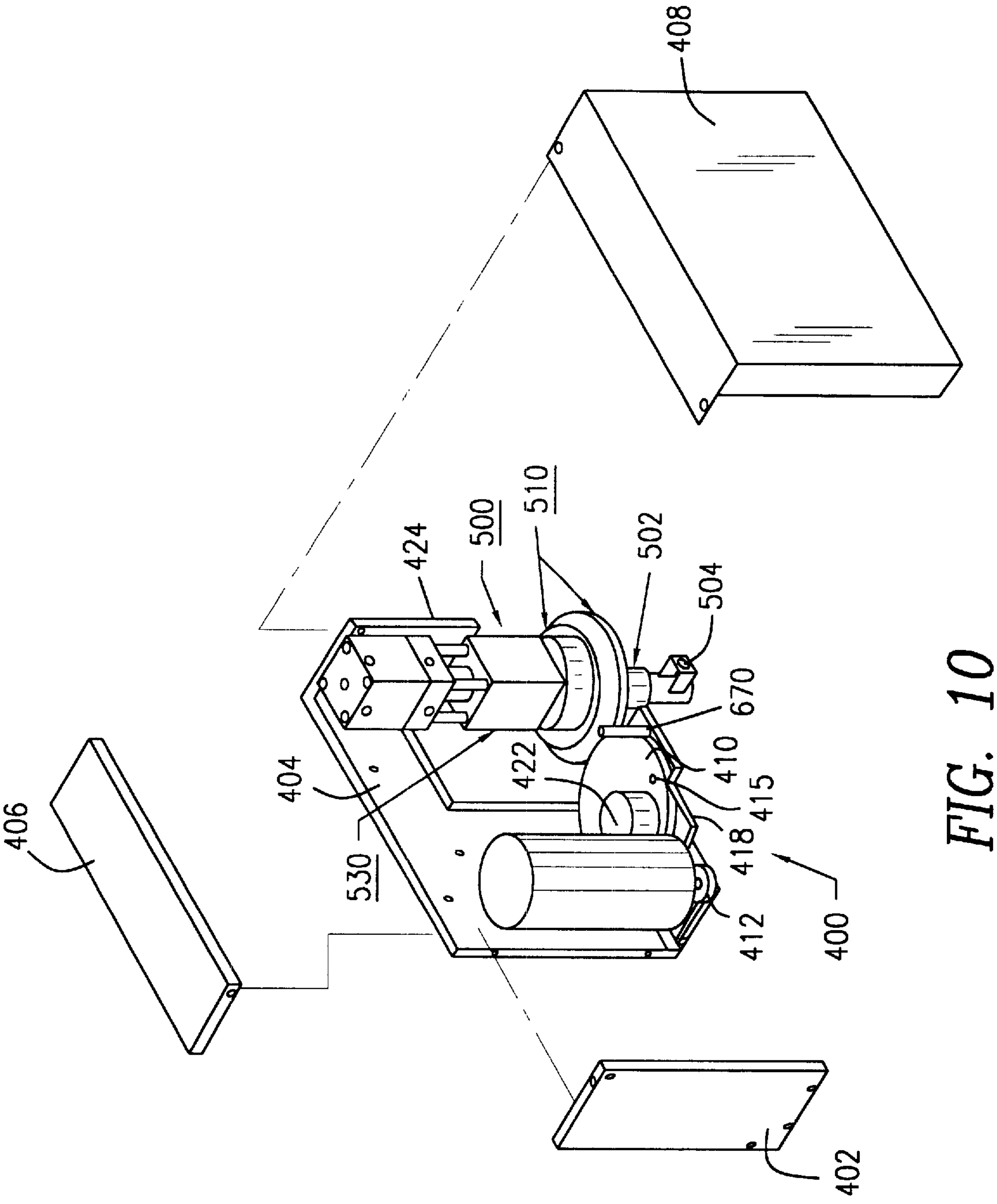
FIG. 10 is a partially exploded front perspective view of the automated glass sealing apparatus of the present invention showing the dispensing head rotation assembly in conjunction with the swivel dispensing head assembly and their component parts contained therein and in an assembled state.
Figure 11:
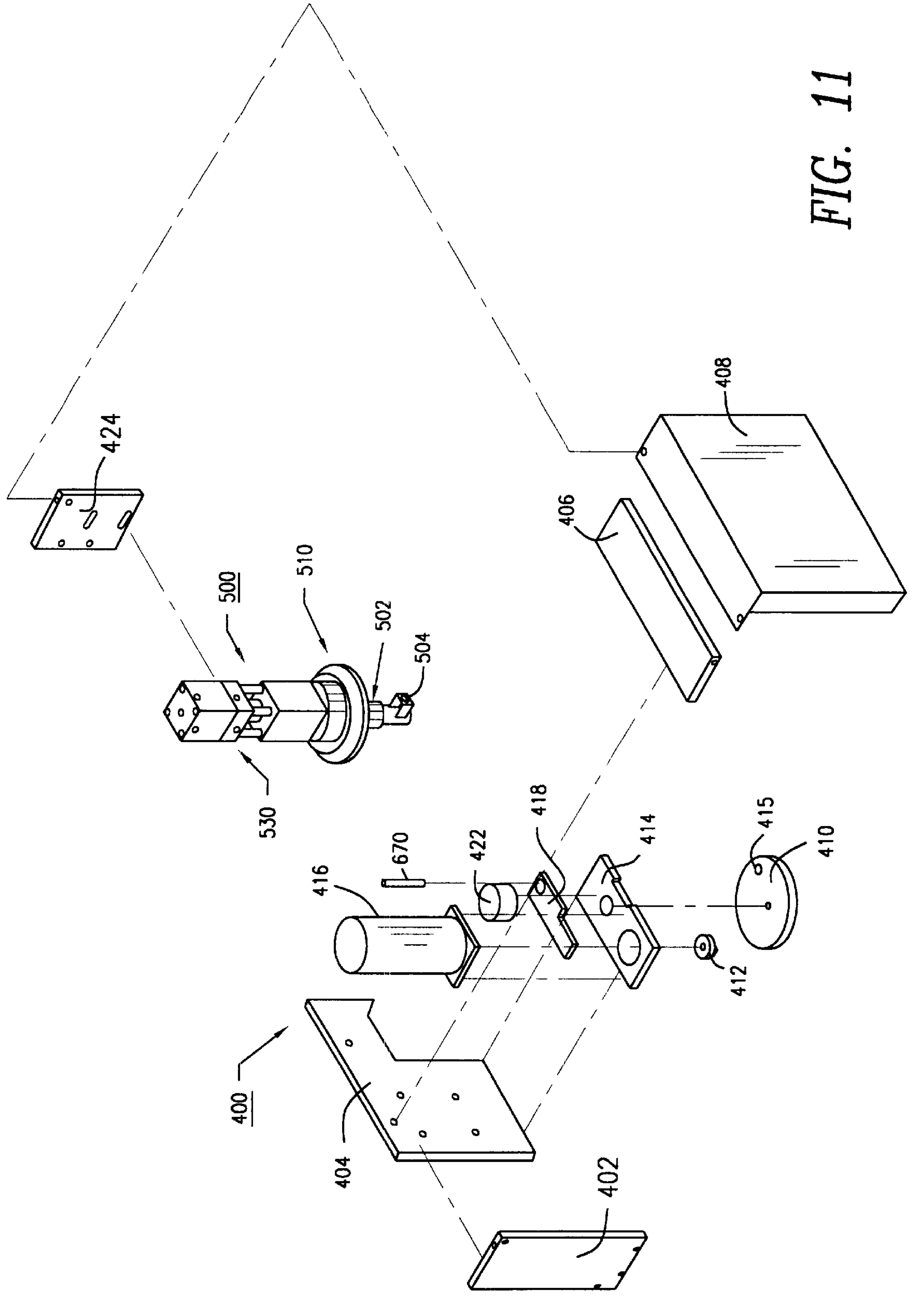
FIG. 11 is an exploded front perspective view of the automated glass sealing apparatus of the present invention showing the dispensing head rotation assembly and its component parts contained therein and in an unassembled state.
Figure 12:
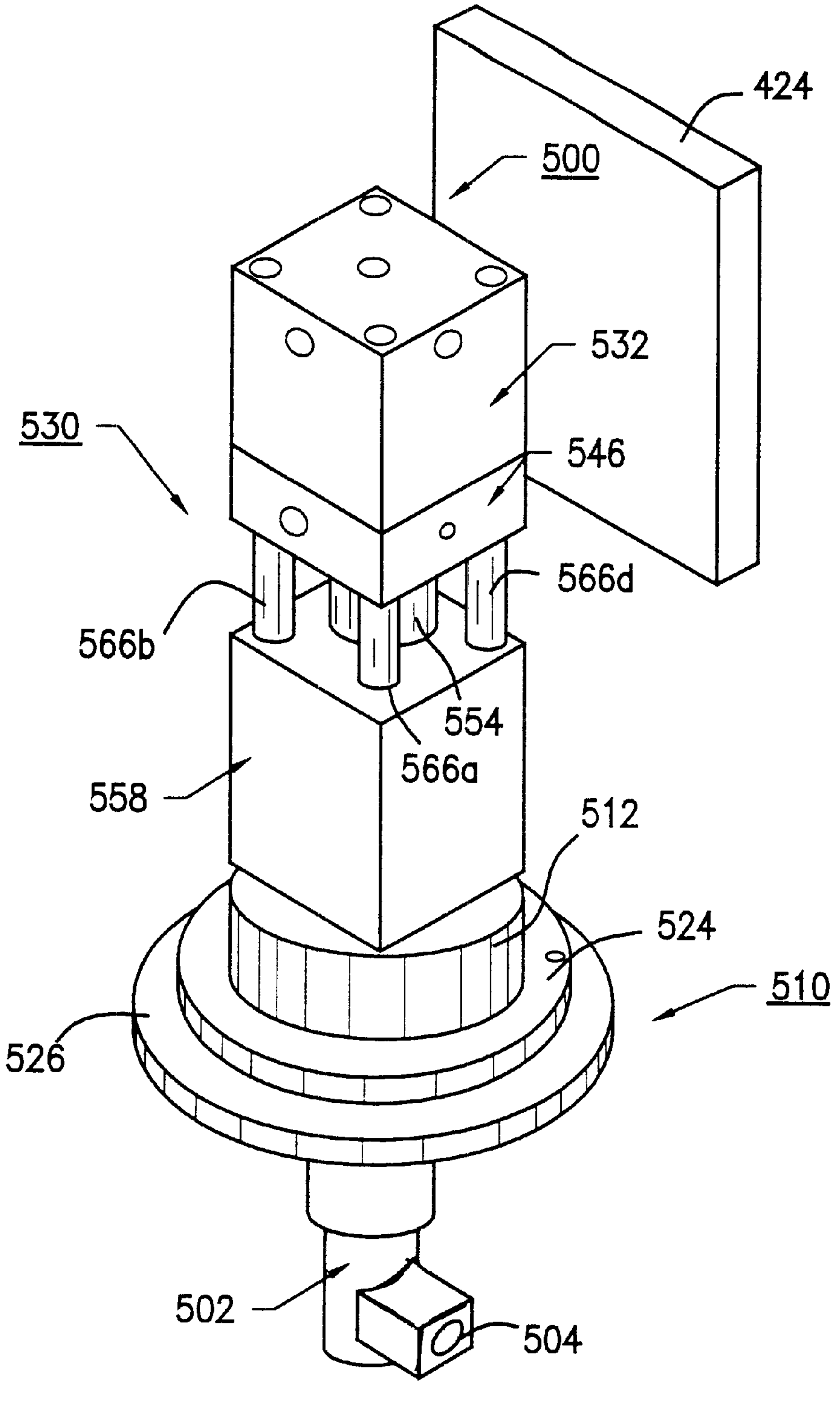
FIG. 12 is a front perspective view of the automated glass sealing apparatus of the present invention showing the swivel dispensing head assembly and its component parts contained therein and in an assembled state.

The dispensing head rotation assembly 400, as depicted in FIGS. 1, 10, 11, 17, 18 and 19 of the patent drawings, is used for rotating the dispensing nozzle 502 of the swivel dispensing head assembly 500, as the dispensing nozzle 502 extrudes the sealant material 12 around each of the first, second, third and fourth corners 46, 48, 50 and 52 of the spacer frame 20. The dispensing head rotation assembly 400 includes a side panel cover 402 being connected to the head mounting plate 404 and to the top panel cover plate 406. Head mounting plate 404 is used to mount the entire dispensing head rotation assembly 400 to the vertical head slide piston 230, as shown in FIGS. 10 and 11 of the drawings. Dispensing head rotation assembly 400 also includes a head panel cover 408 which is used as the main assembly 400 cover, such that the top panel cover plate 406 attaches to the head panel cover 408 in order to cover the rotating assembly 400. Dispensing head rotation assembly 400 further includes first and second gears 410 and 412 in which to rotate the dispensing nozzle 502 of the swivel dispensing head assembly 500, and a gear plate 414 for mounting the first gear 410 and the head rotation motor 416 together. Head rotation motor 416 is used to rotate the dispensing nozzle 502 via the swivel dispensing head assembly 500. Additionally, the dispensing head rotation assembly 400 also includes a nozzle home sensor mounting bracket 418 for mounting of the nozzle home sensor 420, a bearing retainer member 422 for holding the bearings (not shown) for the first gear 410 and a head mounting plate 424 being used for mounting the dispense valve rear housing 532 and the dispense valve center housing 546 within the dispensing head rotating assembly 400. The nozzle home sensor 670 is used for sensing the home position 54 of the dispensing nozzle 502 relative to tabletop 112.

Swivel Dispensing Head Assembly 500

Figure 17:
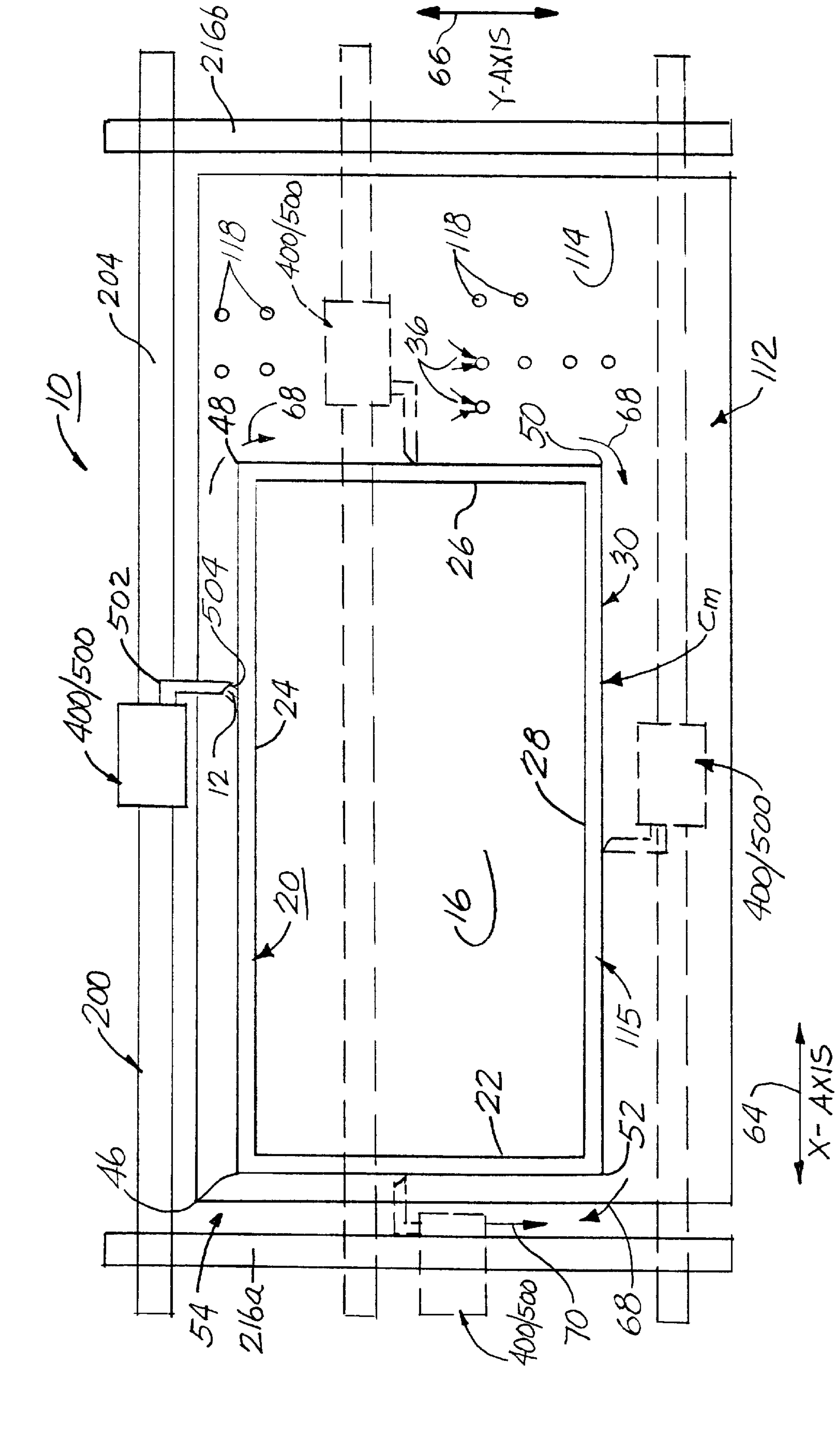
FIG. 17 is a schematic diagram of the automated glass sealing apparatus of the present invention showing the dispensing nozzle of the swivel dispensing head assembly in operational use for extruding sealant material to an insulated glass panel assembly.
Figure 18:
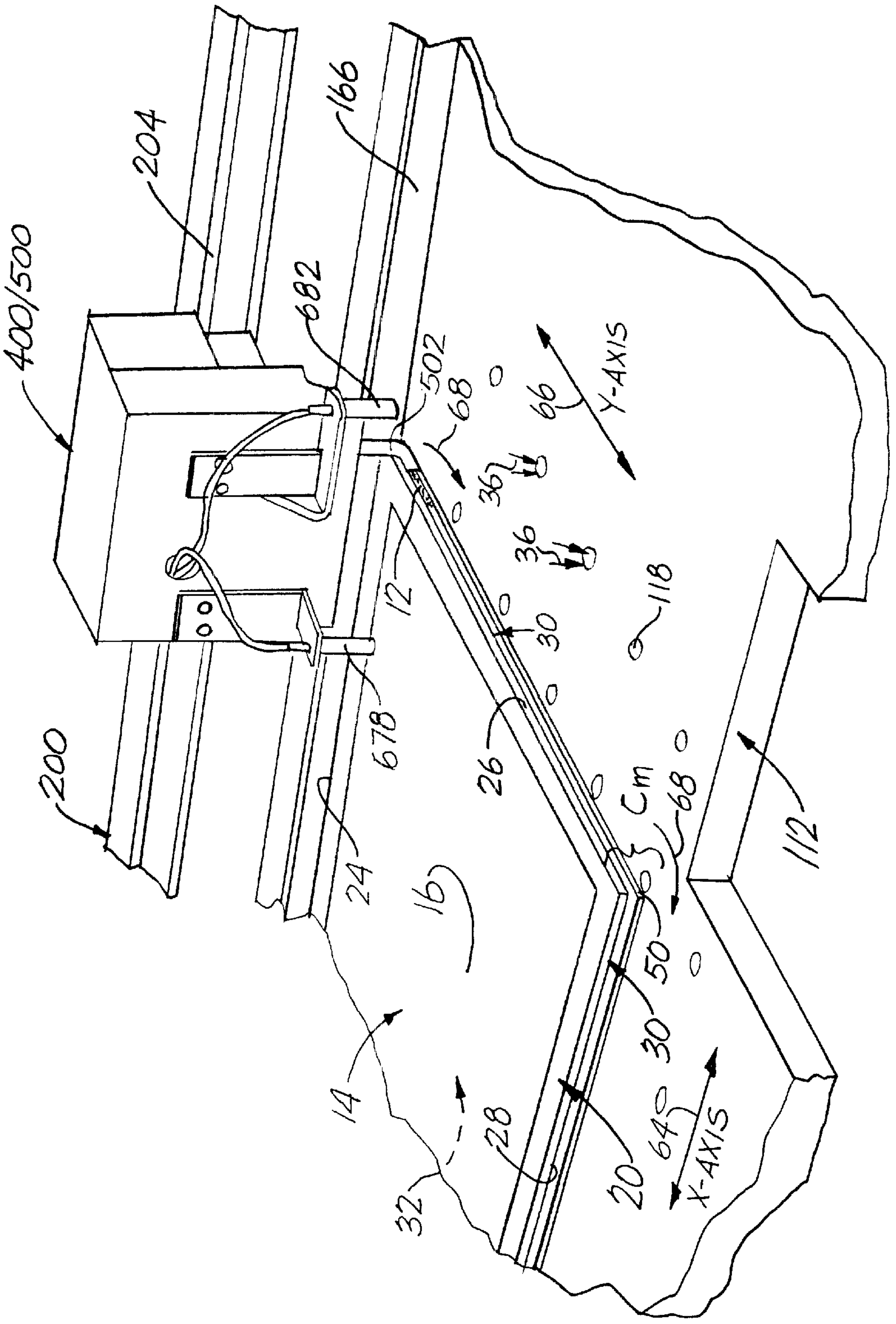
FIG. 18 is a front perspective view of the automated glass sealing apparatus of the present invention showing the dispensing nozzle of the swivel dispensing head assembly in operational use for extruding sealant material around the second corner within the sealing area of the insulated glass panel assembly.

The swivel dispensing head assembly 500, as depicted in FIGS. 1, 11, 12, 13, 17, 18 and 19 of the patent drawings, is used as a valving component which receives sealant material 12 from hose 40, as well as the swiveling and rotating means for rotating the dispensing nozzle 502 as it dispenses the sealant material 12 within the sealing area 30 of the spacer frame 20. The swivel dispensing head assembly 500 includes a dispensing nozzle 502, having a nozzle opening 504 therein, a swivel rotation member sub-assembly 510 and a dispensing valve sub-assembly 530. Dispensing nozzle 502 is used to apply the sealant material 12 through nozzle opening 504 within the sealing area 30 of the perimeter sides 22, 24, 26 and 28 of spacer frame 20 in order to form the insulated glass panel assembly 14, as shown in FIGS. 17 and 18 of the drawings. The swivel rotation member sub-assembly 510 is used for swiveling and rotating the dispensing nozzle 502 around each corner 46, 48, 50 and 52 of spacer frame 20, as the dispensing nozzle 502 extrudes the sealant material 12 within the sealing area 30 of spacer frame 20. The dispensing valve sub-assembly 530 is used for transferring and movement of the sealant material 12 from the heated sealant material drum 42 via hose 40 to the dispensing nozzle 502.

The swivel rotation member sub-assembly 510 includes the following component parts therein: a swivel hub 512, a swivel seal retaining ring 514, a swivel seal 516, a swivel locking plate 518, having a first locking section **520*a* and a second section 520*b*, locking a pair of swivel bearings 522*a* and 522*b*, a swivel front hub 524, a swivel gear 526, a swivel stem 528 and a valve seat 543. The swivel hub 512 is used to mount the swivel rotation member sub-assembly 510 to that of the dispensing valve sub-assembly 530. The swivel seal retaining ring 514 is used for holding the swivel seal 516 in place. Swivel seal 516 is used as an internal seal to prevent leakage of the sealant material 12 within the swivel rotating member sub-assembly 510. Each of the locking plate sections 520*a* and 520*b* of swivel locking plate 518 are used for holding together the swivel front hub 524 to the swivel hub 512. Swivel bearings 522*a* and 522*b* are used for transferring the rotational movements of the swivel front hub 524. The swivel front hub 524 is the moving element of the swivel rotation member sub-assembly 510, such that the swivel gear 526 is mounted to the swivel front hub 524, as well as the swivel stem 528 in order to rotate dispensing nozzle 502. Swivel gear 526 is used for meshing with the head rotation motor 416 and head gears 410 and 412 in order to rotate the swivel front hub 524. The swivel stem 528 is used for connecting the dispensing nozzle 502 to the swivel front hub 524 in which to rotate the dispensing nozzle 502**.

Figure 13:
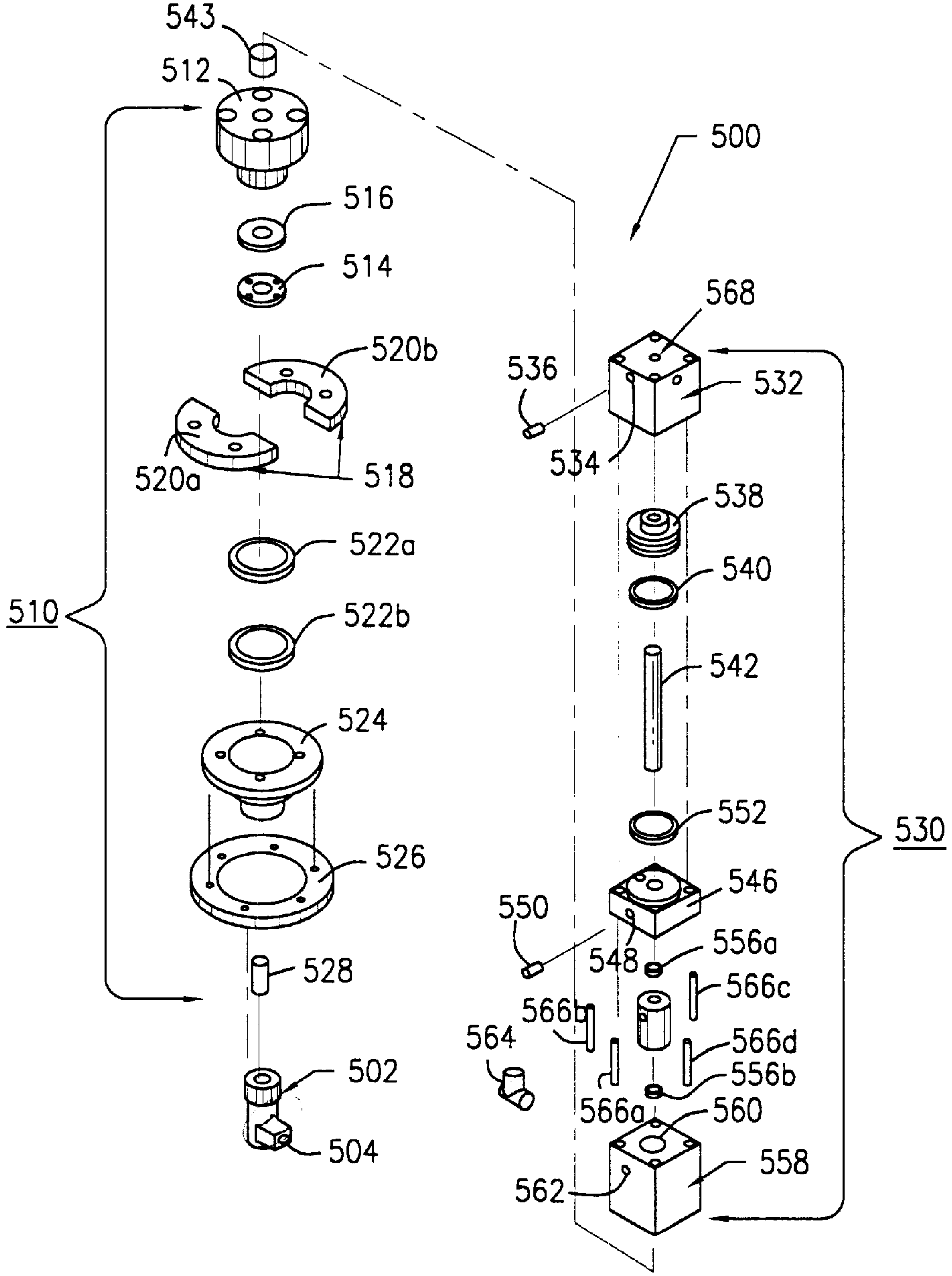
FIG. 13 is an exploded front perspective view of the automated glass sealing apparatus of the present invention showing the swivel dispensing head assembly and its component parts contained therein and in an unassembled state.

The dispensing valve sub-assembly 530 includes the following component parts therein: a dispense valve rear housing 532 having an air hose fitting opening 534 for receiving an air hose fitting 536 therein, a trigger piston 538 having a first O-ring seal 540 thereon, a valve stem 542 having male portion end 544, a dispense valve center housing 546 having an air hose fitting opening 548 for receiving an air hose fitting 550 therein and having a second O-ring seal 552 thereon, a seal retainer 554, a valve stem seal 556, a head valve block 558 having a first central hole opening 560 for receiving the male portion end 544 of the valve stem 542 and a second central hole opening 562 for receiving a hose connector member 564 thereto, and a plurality of spacer pins **566*a* to 566*d* for separating the head valve block 558 from the dispense valve center housing 546. The dispense valve rear housing 532 is used as the air cylinder portion of the dispense valve sub-assembly 530. Dispense valve rear housing 532 includes a central bore opening 568 for the trigger piston 538. Valve stem 542 is connected to the trigger piston 538 and that trigger piston 538 is used for moving the valve stem 542 to an open or closed position within the head valve block 558 in which the sealant material 12 flow is started or stopped, respectively. The dispense valve center housing 546 is the other end of the air cylinder portion of the dispense valve sub-assembly 530. Each of the air hose fittings 536 and 550 receive pressurized air 720 from an air compressor 722 in which to activate the trigger piston 538 to move the valve stem 542 within head valve block 558 to an open or closed position via the air cylinder portions of the dispense valve rear and center housings 532 and 546, respectively. Seal retainer 554 is used for holding the valve stem seal 556 in place. The valve stem seals 556*a* and 556*b* are used for stopping any leakage of sealant material 12 from the head valve block 558. The head valve block 558 is used as the valve portion of the dispensing valve sub-assembly 530 in which the hose connector member 564 is detachably connected to the head valve block 558 in order to receive the sealant material 12 via supply hose 40, as depicted in FIG. 13 of the drawings. Each of the O-ring seals 540 and 552 also prevents any leakage of sealant material 12 from going into the swivel rotation member sub-assembly 510** when in operational use thereof.

Electronic Control System 600

The electronic control system 600, as shown in FIGS. 1, 14, 15 and 16 of the patent drawings, is used for electronically controlling the operation of the automated glass sealing apparatus 10. Electronic control system 600 provides the electronic controls for the aforementioned assemblies 100, 200, 300, 400, 500 and 700. The electronic control system 600 includes a computer control module 602, a power supply 604, a plurality of solid state relays 606, 608, 610, 612, 614, 616, 618 and 620 being electronically connected to a plurality of solenoids 706, 708, 710, 712, 714, 716 and 718, respectively, and to a main contactor 622. The electronic control system 600 further includes a plurality of servomotor controllers 624, 626 and 628 for swivel servomotor 416, x-axis servomotor 250 and y-axis servomotor 260, respectively, a mounted electronic control panel box 120 and a portable electronic control cabinet and panel box 180. The electronic control system 600 also includes a plurality of sensors 670, 672, 674, 678, 680, 682 and 684 for controlling assemblies 200, 300, 400 and 500.

Control panel box 120 includes a first heat controller button/switch 630 for regulating the heat of the sealant material 12 going through the swivel dispensing head assembly 500, a second heat controller button/switch 632 for regulating the heat of the sealant material 12 going through the pressure compensator valve 160, a power button/switch 634, a ready light 636 having a lens 638 and light bulb 640, a power-on light 642 having a lens 644 and a light bulb 646, and a reset switch/button 648. Control panel cabinet 180 includes a first heat controller/switch 650 for regulating the heat of the swivel dispensing head assembly 500, a second heat controller button/switch 652 for regulating the heat of the pressure compensator valve 160, a power button/switch 654, a start button/switch 655, a start light 656 having a lens 658 and light bulb 660, a power-on light 662 having a lens 664 and light bulb 666, and a reset switch/button 668. Control panel 180 also includes a reset light 692 having a lens 694 and a light bulb 696, and an emergency stop button 698. The electronic control system 600 also includes an emergency stop button/switch 686 and a foot pedal start-up switch 676, as shown in FIGS. 1 and 14 of the drawings. Power button/switch 634 and 654 controls the input of electrical power to apparatus 10. Start button/switch 655 is used for positioning apparatus 10 to its home position 54. Ready light 636 signals the operator that apparatus 10 is up to temperature and ready for operational use. Power-on light 642 and 662 signals the operator that electrical power has been supplied to the main contactor 622 and apparatus 10 is ready for operational use by the operator. Reset switch/button 648 and 668 is used to apply electrical power from the main power supply 604 to the main contactor 622 in which to lock it in the "ON" position. Start light 656 signals the operator that apparatus 10 is ready for operational use thereof. Reset light 692 signals the operator that the power switch 634 and 654 is "ON", but that the main contactor 622 which supplies the electrical power to the rest of the assemblies of apparatus 10 is in an "OFF" position. Emergency stop button/switch 686 and 698 allows the operator to instantaneously stop the operation of apparatus 10 when a problem occurs. Foot pedal start-up switch 676 is used by the operator to initialize the sealing cycle and enables the motor controllers 624, 626 and 628 of electronic control system 600 of apparatus 10, to start the sealing cycle process. This switch 676 will only work when the start light 656 is in the "ON" position.

All apparatus sensors including, as shown in FIG. 14 of the drawings, the swivel home sensor 670, the dispense valve x-axis home sensor 672, the dispense valve x-axis max travel sensor 674, the cycle start switch foot pedal 676, the x-axis glass sizing sensor 678, the dispense valve y-axis max travel sensor 680, the y-axis glass sizing sensor 682, the dispense valve y-axis home sensor 684 and the emergency stop switch 686 feed their appropriate electrical lines into the power supply 604 which is electrically connected to the PLC (programmable logic control) computer control module 602. The swivel home sensor/nozzle home sensor 670 is used for referencing the swivel dispensing head assembly 500 in the home position 54, as depicted in FIG. 17 of the drawings. The dispense valve x-axis home sensor 672 is used to sense and reference the home position 56 of the dispensing head rotation assembly 400 along the x-axis of slide assembly 200, and the dispense valve x-axis max travel sensor 674 is used to sense and reference the maximum allowable travel position 58 of the dispensing head rotation assembly 400 along the x-axis direction of slide assembly 200, as shown in FIGS. 5 and 6 of the drawings. The dispense valve y-axis home sensor 684 is used to sense and reference the home position 60 of the dispensing head rotation assembly 400 along the y-axis of slide assembly 200, and the dispense valve y-axis max travel sensor 680 is used to sense and reference the maximum allowable travel position 62 of the dispensing head rotation assembly 400 along the y-axis direction of slide assembly 200, as shown in FIGS. 5 and 6 of the drawings.

The x-axis glass sizing sensor 678 is used to sense and reference the edges of the glass panels 16 and 18 along the x-axis direction and the y-axis glass sizing sensor 682 is used to sense and reference the edges of the glass panels 16 and 18 along the y-axis direction, as depicted in FIGS. 5, 6 and 18 of the drawings, as these glass sizing sensors 678 and 682 detect and determine the length of the assembled insulated glass panel assembly 14. This auto-sizing feature is needed because the length of the glass panels 16 and 18 and spacer frame 20 may vary, as the assembled insulated glass panel assembly come in many different sizes, such that these glass sizing sensors 678 and 682 negates the need for the operator to input the size of the glass panels 16 and 18 and spacer frame 20 manually to the computer control module 602. In operational use, the glass sizing sensors 678 and 682 work in the following manner: the apparatus 10 is initialized to its home position 54, as shown in FIG. 17 of the drawings, from this reference point the dispensing head rotation assembly 400 will start to move in the x-axis direction. The x-axis glass sizing sensor 678, which is positioned on the tracking dispensing head rotation assembly 400, will sense the edges of the glass panels 16 and 18 in the x-axis direction 64. This sensor 678 will then send a signal back to the computer control module 602, and when the computer control module 602 receives this signal, the position of the dispensing head rotation assembly 400 is captured, thereby capturing the length of the assembled insulated glass panel assembly 14 in the x-axis direction 64. When the dispensing head rotation assembly 400 rotates around the first corner 46 of spacer frame 20 and starts to move in the y-axis direction, the y-axis glass sizing sensor 682 will again sense the edges of the glass panels 16 and 18 in the y-axis direction 66. This sensor 682 will also send a signal back to the computer control module 602, and when the computer control module 602 receives this signal, the position of the dispensing head rotation assembly 400 is again captured, thereby capturing the width of the assembled insulated glass panel assembly 14 in the y-axis direction 66. Thus, the y and x-axis glass sizing sensors 678 and 682 assure that both the dispensing head rotation assembly 400 and the swivel dispensing head assembly 500 are in a precise position for the dispensing of sealant material 12 by dispensing nozzle 502 within each of the perimeter sides 22, 24, 26 and 28 of spacer frame 20.

The computer control module 602 provides the control aspect to the various aforementioned assemblies of apparatus 10. The power supply 604 is used for supplying the electrical power to the aforementioned heat controllers, switches and lights 630, 632, 634, 636, 642, 648, 650, 652, 654, 656, 662 and 668; as well as to the solid state relays 606 to 620, the motor controllers 624 to 628, and servomotors 416,250 and 260. Power supply 604 is also used for supplying electrical solenoids 706 to 718, respectively. Solenoids 706 to 718 are electrically connected to the computer control module 602, as well as to the main contactor 622 via a plurality of electrical lines 690.

Electro-Pneumatic Control System 700

Figure 16:
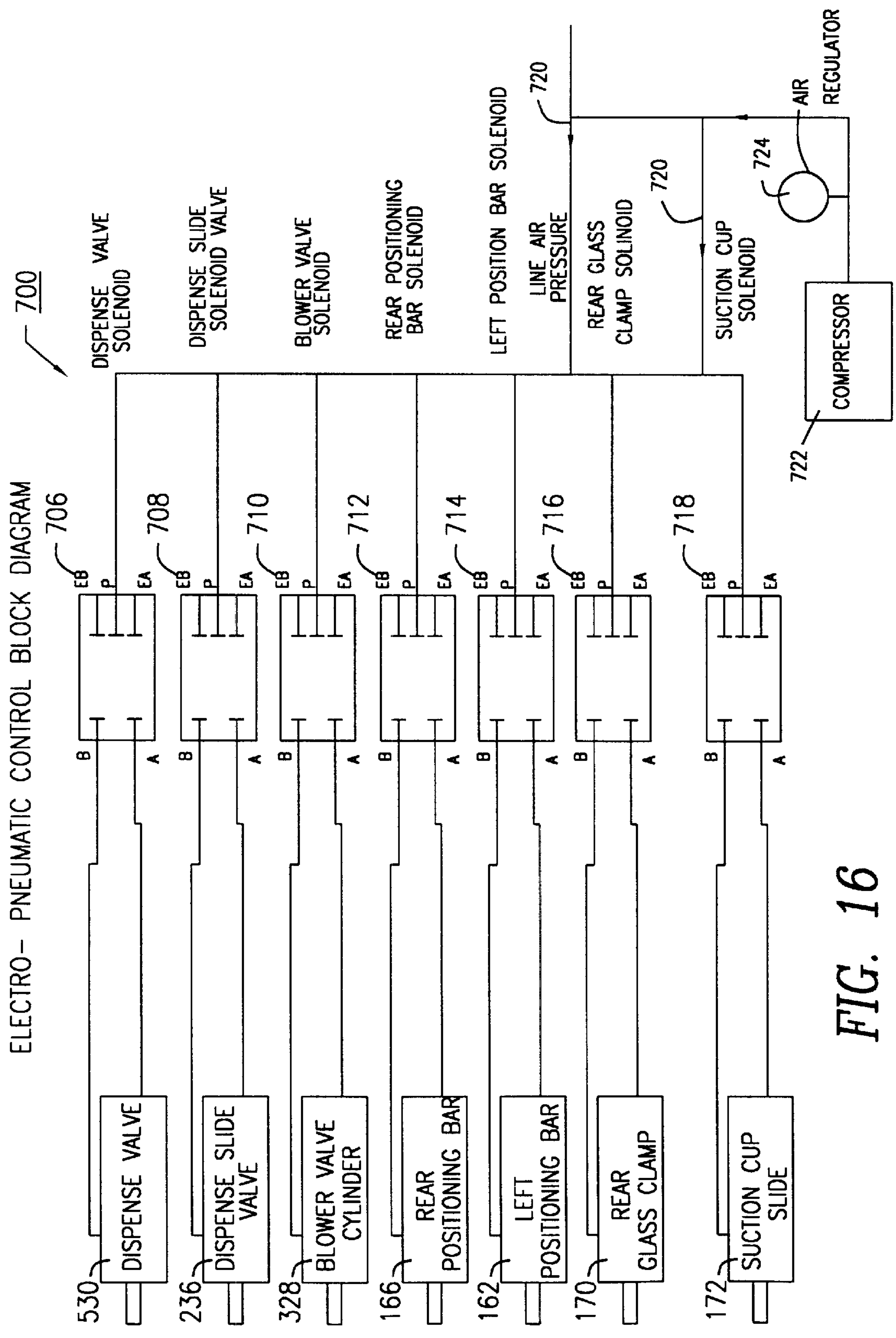
FIG. 16 is a schematic block diagram of the automated glass sealing apparatus of the present invention showing the electro-pneumatic control system and its component parts contained therein.

The electro-pneumatic control system 700, as shown in FIGS. 1, 6, 10, 11 and 16 of the patent drawings, is used for the electro-pneumatic control of the air float and suction piston air cylinder 326 and the plurality of (air operated) solenoids 706, 708, 710, 712, 714, 716 and 718. The electro-pneumatic control system 700 provides the pressurized pneumatic air 720 from the compressed air supply (compressor) 722 in which to power the individual valves 236, 530 and 724, slides 230 and 238 and the air float and suction piston air cylinder 326. The electro-pneumatic control system 700 includes air lines P, A and B having pressurized air 720 therein, at a regulated pressure of 80 psig via an air regulator 724, and a plurality of solenoids 706 to 718 for activating various component parts within each of the major assemblies 100, 200, 300, 400, 500 and 700, respectively. These solenoids include, as shown in FIG. 16, a dispense valve solenoid 706, a dispense slide valve solenoid 708, a blower valve solenoid 710, a rear positioning bar solenoid 712, a left positioning bar solenoid 714, a rear glass clamp solenoid 716, and a suction cup solenoid 718. Dispense valve solenoid 706 is connected to the dispense valve sub-assembly 530 via air lines A and B. Dispense slide valve solenoid 708 is connected to the dispense slide valve 236 via air lines A and B. Blower valve solenoid 710 is connected to the piston air cylinder/blower valve cylinder 328 via air lines A and B. Rear positioning bar solenoid 712 is connected to the rear or back glass guide device 166 via air lines A and B. Left positioning bar solenoid 714 is connected to the left glass guide device 162 via air lines A and B. Rear glass clamp solenoid 716 is connected to the rear glass clamp 170 via air lines A and B. Suction cup solenoid 718 is connected to the suction cup slide 172 via air lines A and B.

The dispense valve solenoid 706 is used for controlling the trigger piston 538 to an open or closed position for the dispensing valve sub-assembly 530 in which to extrude sealant material 12 through dispensing nozzle 502. The dispense slide solenoid valve 708 is used for controlling the operational use of the vertical head slide piston 230 in order to control and adjust the z-axis height of the combined dispensing head rotation assembly 400 and swivel dispensing head assembly 500, as depicted in FIG. 5 of the drawings. The blower valve solenoid 710 is used for controlling the piston air cylinder 328 of the glass air float and suction assembly 300 in order to have either a positive air flow 34 or a negative air flow of a vacuum 36, as shown in FIGS. 1, 8, 18 and 19 of the drawings. The rear positioning bar solenoid 712 is used for controlling the back glass guide device 166 in which to properly position and place the rear side 24 of the spacer frame 20 of the insulated glass panel assembly 14 when in a float mode ($F_m$) prior to the sealing operation. The left positioning bar solenoid 714 is used for controlling the left glass guide device 162 in which to correctly position the left side 22 of the spacer frame 20 of the insulated glass panel assembly 14 in a ready position when in a float mode ($F_m$) prior to the sealing operation start-up. The rear glass clamp solenoid 716 is used for controlling the rear glass clamp 170 in which to firmly hold in place the insulated glass panel assembly 14 on the upper wall surface 114 of air float table top 112 when in a clamp mode ($C_m$) while sealing the left side 22, the back side 24 and the right side 26 of spacer frame 20 with sealant material 12 during the sealing operation. The suction cup slide solenoid 718 is used for controlling the movement of the suction cup slide 172 such that the suction cups **174*a* and 174*b* can be squeezed onto the lower/inner glass panel 18 in order to more firmly hold the entire insulated glass panel assembly 14 in position on the tabletop wall surface 114 of air float tabletop 112 when in a clamp mode ($C_m$) during the sealing operation, as shown in FIGS. 1, 3 and 18** of the drawings.

Operation of the Present Invention

A. Start-Up and Initialization Step:

When the power switch 634 located on the movable control panel 180 is switched to the "ON" position by the operator, the electrical power is supplied to the main power supply 604, the heat controllers 650 and 652, the computer control module 602, and the reset light 692. After the heat controllers 650 and 652 have been initialized, the operator depresses the reset switch 668 and this will engage the main contactor 662 which will supply electrical power to the servomotor controllers 624, 626, 628, servomotors 416, 250, 260, the heated pressure compensator valve 160 (heated systems only), the dispensing valve heater 533 (heated systems only) and the power "ON" light 642. The material supply hoses 40 are heated by the pumping system 38 (heated system only). When the apparatus 10 has reached the proper operating temperature, the system ready light 656 will illuminate and the operator will then depress the start button 655, as depicted in FIG. 15. This will initialize the apparatus 10 as follows:

The computer control module 602 will send a signal to the y-axis servomotor controller 628, which will then cause the y-axis servomotor 260 to rotate the y-axis drive pulley 262, and this will then move the y-axis pulley belt 266. The y-axis pulley belt 266, which is attached to the slide assembly 200, will then move the dispensing head rotation assembly 400, which is attached to the slide assembly 200 toward the dispense valve y-axis home sensor 684. When the dispensing head rotation assembly 400 reaches the dispense valve y-axis home sensor 684, the y-axis home sensor 684 will send a signal back to the computer control module 602. The computer control module 602 will then send a signal to the y-axis servomotor controller 628 to stop the movement of the y-axis servomotor 628. This then halts the movement of the y-axis pulley belt 266 that also halts the movement of the dispensing head rotation assembly 400. This is the home position 60 for the dispensing head rotation assembly 400 in the y-axis direction 66, as shown in FIG. 5.

Next, the computer control module 602 will send a signal to the x-axis servomotor controller 626; this will cause the x-axis servomotor 250 to rotate the x-axis drive pulley 252. This will then move the x-axis pulley belt 256, which is attached to the slide assembly 200, and in turn will move the dispensing head rotation assembly 400 (which is attached to slide assembly 200) toward the dispense valve x-axis home sensor 672. When dispensing head rotation assembly 400 reaches the dispense valve x-axis home sensor 672, the x-axis home sensor 672 will send a signal back to the computer control module 602. The computer control module 602 will then send a signal to the x-axis servomotor controller 626 to stop the movement of the x-axis servomotor 250. This then halts the movement of the x-axis pulley belt 256 which also halts the movement of the dispensing head rotation assembly 400. This is the home position 56 for the dispensing head rotation assembly 400 in the x-axis direction.

The final home positioning 54 for the dispensing nozzle 502 is accomplished in the following manner: The computer control module 602 will send a signal to the swivel servomotor controller 624 which will then cause the swivel motor 416 to turn, and this action will rotate the second gear 412, which is attached to the swivel servomotor 416. The second gear 412 will rotate the first gear 410 causing the dispensing nozzle 502, which is connected to the swivel front hub 524, to turn. The nozzle 502 will continue to turn until the home locating opening 415 in the first gear 410 is aligned with the nozzle home sensor 670. When this alignment occurs, a signal is sent back to the computer control module 602. The computer control module 602 will then send a signal to the swivel servomotor controller 624 to stop the movement of the swivel servomotor 416 and this is then the nozzle home position 54.

Figure 19:
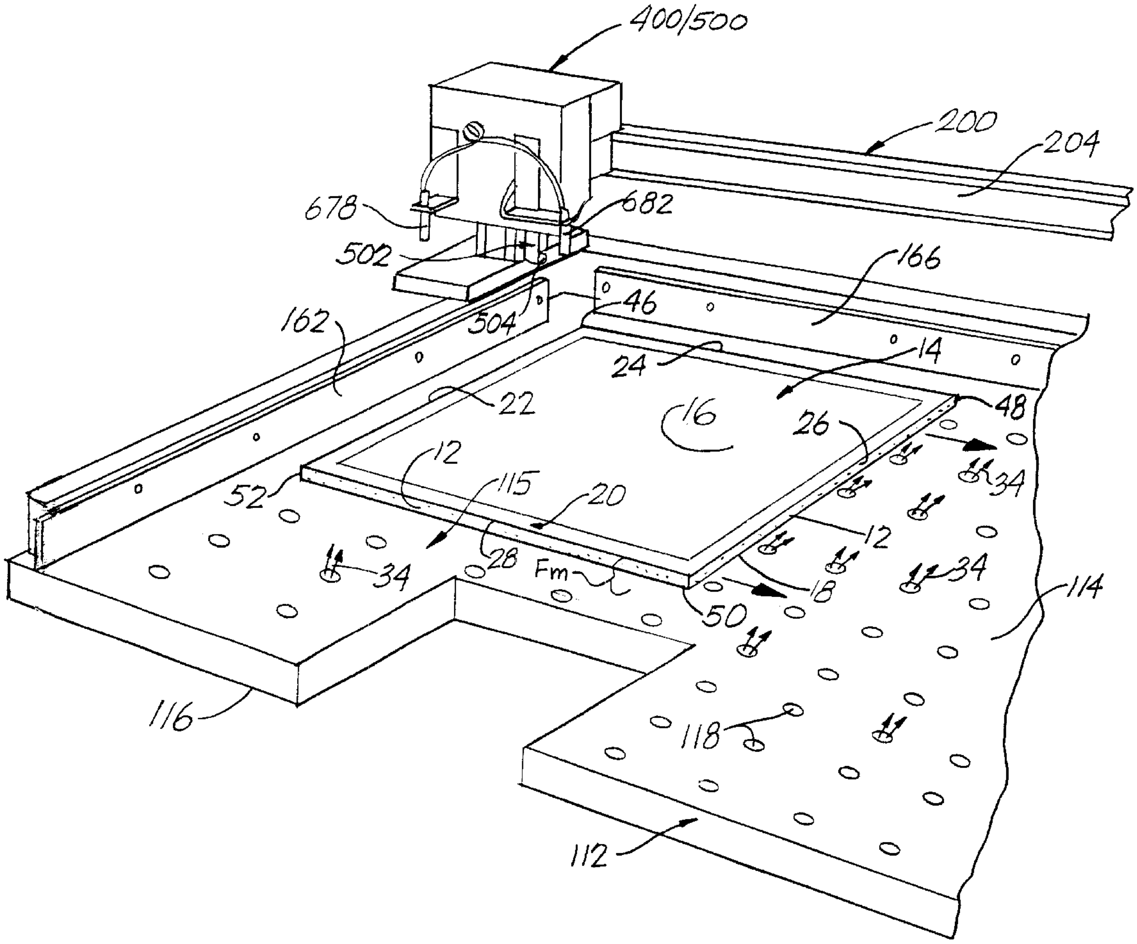
FIG. 19 is a front perspective view of the automated glass sealing apparatus of the present invention showing the insulated glass panel assembly in a float mode after the completion of sealing the glass panel assembly with sealant material.

B. Inserting the Glass Panel and Cycle Operation Step:

After the apparatus 10 has been initialized, the operator must turn on the blower switch 661 and this then supplies electrical power to the air blower 302. The air blower 302 then takes the ambient air 34 through an air filter 320 and into the air blower 302, such that the air 34 is pressurized by the air blower 302 and is fed through a series of connector pipes **308*a* to 308*i* and air hose members 306*a* to 306*i* into the air holding pans 136*a* to 136*d* connected to the bottom wall surface 116 of the air float table top 112. This pressurized air 34 exits through the air/vacuum hole openings 118 located on upper top wall surface 114 of the air float tabletop 112 enabling the insulated glass panel assembly 14 to float above the air float tabletop 112 in a float mode ($F_m$), as shown in FIGS. 1 and 19 of the drawings. The operator then places the insulated glass panel assembly 14 onto the tabletop sealing area 115 of the upper top wall surface 114 of air float tabletop 112 and against the left glass guide device 162, as well as against the back glass guide device 166. This position also places the lower glass panel 18 over the suction cups 174***a* and 174*b*, this will complete the placement of the insulated glass panel assembly 14 in the home position 54.

The operator then depresses the cycle start foot switch 676 where then a signal is sent to the computer control module 602 to start the sealing operation cycle of apparatus 10. The computer control module 602 will enable the solid state relay 610, which will then activate the blower valve solenoid 710 and this will then enable the piston air cylinder 328, which will move the piston rod 324 and air directional piston 322. This aforementioned action will change the airflow of air 34 to the air float table top 112 from air float mode ($F_m$) to a vacuum/suction 36 of a clamping mode ($C_m$). The vacuum 36 through the air/vacuum hole openings 118 in the air float table top 112 will hold the insulated glass panel assembly 14 firmly in place on the upper top wall surface 114 of the air float tabletop 112. Simultaneously, the computer control module 602 will enable the solid state relay 618 which will also enable the suction cup slide solenoid 718, thereby attaching the suction cups 174*a* and 74*b* to the insulated glass panel assembly 14 for additional hold down capability. Next, the solid state relay 616 will enable the rear glass clamp solenoid 716 and this will also clamp and hold the insulated glass panel 14 more firmly to the upper top wall surface 114 of air float table top 112. The next occurrence is when the solid state relay 614 enables the left positioning bar solenoid 714, which then causes the left glass guide device 162 to move away from the insulated glass panel 14.

The dispensing head rotation assembly 400 will then move into position as follows: The computer control module 602 enables the solid state relay 608, where then the solid state relay 608 enables the dispense slide solenoid 708 and this then causes the dispense slide mechanism 238 to lower the dispensing head rotation assembly 400 to a point where the dispensing nozzle 502 is centered vertically within the sealant application area 30 of the spacer frame 20 of the insulated glass panel 14. Next, the computer control module 602 sends a signal to the y-axis servomotor controller 628 and the x-axis servomotor controller 626 simultaneously, enabling both the y-axis servomotor 260 and the x-axis servomotor 250. The x-axis servomotor rotates the x-axis drive pulley 252 and this then will move the x-axis pulley belt 256. The pulley belt 256 is attached to the dispense slide mechanism 238, and the dispense slide mechanism 238 moves the dispensing head rotation assembly 400 into the sealing position in the x-axis direction 64, as shown in FIGS. 5 and 17. The next action has the y-axis servomotor 260 being rotated by the y-axis drive pulley 262 which in turn moves the y-axis pulley belt 266 and this then moves the dispensing head rotation assembly 400 into sealing position in the y-axis direction 66. At this point, the dispensing nozzle 502 should be positioned between the glass panes 16 and 18 and against the spacer frame 20 with the nozzle opening 504 being perpendicular to the sealing area 30 of the spacer frame 20. The solid state relay 606 is then enabled by the computer control 602 and this concurrently engages the dispense valve solenoid 706. This action then supplies pressurized air 720 from compressor 722 to the trigger piston 538 and this then causes movement of the trigger piston 538, which pulls back the valve stem 542. This movement unseats the valve stem 542 from the valve seat 543, thus enabling the sealant material 12 to flow from the swivel dispensing head assembly 500 through the center of the dispensing nozzle 502, out of the nozzle opening 504 and into the sealant application area 30 of the spacer frame 20 of insulated glass panel assembly 14.

Simultaneously, the solid state relay 616 is again disabled and this then disables the rear glass clamp solenoid 716 which releases the rear glass clamp 170 from the insulated glass panel assembly 14. Simultaneously, the solid state relay 612 is enabled, which enables the rear positioning bar solenoid 712. This then moves the back glass guide device 166 away from the front side 28 of spacer frame 20 of the insulated glass panel assembly 14, thus allowing clearance for the dispensing head rotation assembly 400 to seal the rear side 24 of spacer frame 20 of the insulated glass panel assembly 14.

Simultaneously, the x-axis servomotor 250 is enabled, and the dispensing head rotation assembly 400 moves along the x-axis direction 64, depositing the sealant material 12 along the rear perimeter side 24 of the spacer frame 20 of insulated glass panel assembly 14. The dispensing head rotation assembly 400 continues to move in this direction until the x-axis glass sizing sensor 678 detects the right perimeter side 26 of the spacer frame 20 of insulated glass panel assembly 14. At this point in the sealing operation, the computer control module 602 disables the solid state relay 606 which also disables the dispense valve solenoid 706. This then changes the direction of the trigger piston 538 which pushes the valve stem 542 into the valve seat 543 shutting off the flow of sealant material 12. Simultaneously, the x-axis servomotor 250 is disabled stopping the motion of the dispensing head rotation assembly 400.

The next step is for the dispensing head rotation assembly 400 to turn 90 degrees from the rear side 24 of spacer frame 20 to right side 26 of spacer frame 20. Then the x-axis servomotor 250, the y-axis servomotor 260 and the swivel servomotor 416 are enabled by the x-axis servomotor controller 626, the y-axis servomotor controller 628 and the swivel servomotor controller 624 concurrently. The computer control module 602 will send a signal to each of the servomotor controllers 624, 626 and 628 to simultaneously move. This interpolated motion will cause the dispensing nozzle opening 504 to stay in the same centerline while the rest of the dispensing nozzle 502 is rotated about the axis. At this point the nozzle opening 504 is perpendicular to the spacer frame 20 on right side 26 of the insulated glass panel assembly 14. Next, the solid state relay 606 is enabled by the computer control module 602, which engages the dispense valve solenoid 706 and this supplies pressurized air 720 from air compressor 722 to the trigger piston 538. This simultaneous action causes movement of the trigger piston 538, which pulls back the valve stem 542 and this then unseats the valve stem 542 from the valve seat 543 enabling the sealant material 12 to flow from the swivel dispensing head assembly 500 through the center of the dispensing nozzle 502, out of the nozzle opening 504 and into the sealant application area 30 of the insulated glass panel assembly 14.

Simultaneously, the y-axis servomotor 260 is enabled and the dispensing head rotation assembly 400 moves along the y-axis direction 66, depositing the sealant material 12 along the right side 26 of the spacer frame 20 of insulated glass panel assembly 14. The dispensing head rotation assembly

400 continues to move in the y-axis glass sizing sensor 682 detects the third side (front side) 28 of the spacer frame 20 of insulated glass panel assembly 14. At this point the computer control module 602 disables the solid state relay 606 which also disables the dispense valve solenoid 706 and this again changes the direction of the trigger piston 538 which pushes the valve stem 542 into the valve seat 543 shutting off the flow of sealant material 12. Simultaneously, the y-axis servomotor 260 is disabled stopping the motion of the dispensing head rotation assembly 400. The next step is for the dispensing head rotation assembly 400 to turn 90 degrees from the back side 24 of spacer frame 20 to the right side 26 of spacer frame 20. The x-axis servomotor 250, the y-axis servomotor 260 and the swivel servomotor 416 will be enabled by the x-axis servomotor controller 626, the y-axis servomotor controller 628 and the swivel servomotor controller 624 concurrently. The computer control module 602 will send a signal to each of the servomotor controllers to simultaneously move. This interpolated motion will cause the dispensing nozzle opening 504 to stay in the same centerline while the rest of the dispensing nozzle 502 is rotated about the axis. At this point the nozzle opening 504 is perpendicular to the spacer frame 20 on the front side 28 (of spacer frame 20) of the insulated glass panel assembly 14 and the front side 28 of spacer frame 20 is ready to be sealed. Again, the next step being the solid state relay 606 is enabled by the computer control module 602 and this then engages the dispense valve solenoid 706 which supplies pressurized air 720 from air compressor 722 to the trigger piston 538. This simultaneous action causes movement of the trigger piston 538, which pulls back the valve stem 542 and this then unseats the valve stem 542 from the valve seat 543 enabling the sealant material 12 to flow from the swivel dispensing head assembly 500 through the center of the dispensing nozzle 502, out of the dispensing nozzle opening 504 and into the sealant application area 30 of the insulated glass panel assembly 14. Simultaneously, the x-axis servomotor 250 is enabled and the dispensing head rotation assembly moves along the x-axis direction 64, depositing the sealant material 12 along the front side 28 of spacer frame 20 of the insulated glass panel assembly 14. The dispensing head rotation assembly 400 continues to move in the x-axis direction 64 towards a preset reference position as determined by the home sensor 672 prior to the sealing cycle. At this point, the computer control module 602 disables the solid state relay 606 which also disables the dispense valve solenoid 706, and again this changes the direction of the trigger piston 538, which pushes the valve stem 542 into the valve seat 543 shutting off the flow of sealant material 12. Simultaneously, the x-axis servomotor 250 is disabled stopping the motion of the dispensing head rotation assembly 400.

The next step is for the dispensing head rotation assembly 400 to turn 90 degrees from the front side 28 of spacer frame 20 to the left side 22 of spacer frame 20. Again, the x-axis servomotor 250, the y-axis servomotor 260 and the swivel servomotor 416 will be enabled by the x-axis servomotor controller 626, the y-axis servomotor controller 628 and the swivel servomotor controller 624 concurrently. The computer control module 602 will send a signal to each of the servomotor controllers to simultaneously move. This interpolated motion will cause the dispensing nozzle opening 504 to stay in the same centerline while the rest of the dispensing nozzle 502 is rotated about the axis. At this point the nozzle opening 504 is perpendicular to the spacer frame 20 on the left side 22 of the insulated glass panel assembly 14. Next, the solid state relay 606 is enabled by the computer control 602 and this then engages the dispense valve solenoid 706 which supplies pressurized air 720 to the trigger piston 538. This then causes movement of the trigger piston 538 which pulls back the valve stem 542 and this action unseats the valve stem 542 from the valve seat 543 enabling the sealant material 12 to flow from the swivel dispensing head assembly 500 through the center of the dispensing nozzle 502, and out of the dispensing nozzle opening 504 and into the sealant application area 30 of spacer frame 20 of the insulated glass panel assembly 14.

Simultaneously, the y-axis servomotor 260 is enabled and the dispensing head rotation assembly moves along the y-axis direction 66, depositing the sealant material 12 along the front side 28 of spacer frame 20 of the insulated glass panel assembly 14. The dispensing head rotation assembly 400 continues to move in the y-axis direction 66 towards a preset reference position as determined by the home sensor 684 prior to the start of the sealing cycle. At this point the computer control module 602 disables the solid state relay 606 which also disables the dispense valve solenoid 706 and again this changes the direction of the trigger piston 538, which pushes the valve stem 542 into the valve seat 543 shutting off the flow of sealant material 12. Simultaneously, the y-axis servomotor 250 is disabled stopping the motion of the dispensing head rotation assembly 400.

C. Operation Cycle Complete Step:

Once the dispensing head rotation assembly 400 has completed its clockwise rotation 68 around the entire perimeter sides 24, 26, 28 and 22 of spacer frame 20 of the insulated glass panel 14 and is positioned in the first corner 46, as shown in FIG. 17. The computer control module 602 sends a signal to the x-axis servomotor controller 626 and also to the swivel servomotor controller 624, such that the y-axis servomotor 260 and the swivel servomotor 416 are enabled in an interpolated motion to move the dispensing head rotation assembly 400 along the left side 22 spacer frame 20 of the insulated glass panel assembly 14 in the opposite counterclockwise direction 70 of the sealing operation, while simultaneously rotating the dispensing nozzle 502 away from the left side 22 of spacer frame 20 of the insulated glass panel assembly 14 thereby wiping the dispensing nozzle opening 504 clean of any excess sealant material 12, as shown in FIG. 17. Once this motion is complete the computer control module 602 disables the solid state relay 608. The solid state relay 608 disables the dispense slide solenoid 708 and this causes the dispense slide mechanism 238 to raise the dispensing head rotation assembly 400 to its raised home position 54. Simultaneously, the computer control module 602 will disable the solid state relay 610, which will deactivate the blower valve solenoid 710 and this then will disable the piston air cylinder 328, which will move the piston rod 324 and air directional piston 322. Thus, again this will change the air flow 34 to the upper top wall surface 114 of air float tabletop 112 from vacuum or clamping mode($C_m$) to an air float mode ($F_m$). The air 34 through the air/vacuum hole openings 118 on the upper top wall surface 114 in the air float tabletop 112 will lift the insulated glass panel assembly 14 to allow easy removal from the air float table top 112. Also, simultaneously, the computer control module 602 will disable the solid state relay 618, which will also disable the suction cup slide solenoid 718, thereby releasing the suction cups 174*a* and 174*b* from the insulated glass panel assembly 14 Finally, the computer control module 602 will send a signal to the y-axis servomotor controller 628, which will then cause the y-axis servomotor 260 to rotate the y-axis drive pulley 262 and this then will move the y-axis pulley belt 266. The y-axis pulley belt 266, which is attached to the slide assembly 200, will move the dispensing head rotation assembly 400 (which is attached to the slide assembly 200) toward the dispense valve y-axis home sensor 684. When the dispensing head rotation assembly 400 reaches the dispense valve y-axis home sensor 684, the dispense valve y-axis home sensor 684 will send a signal back to the computer control module 602. The computer control module 602 will then send a signal to the y-axis servomotor controller 628 to stop the movement of the y-axis servomotor 628 which then halts the movement of the y-axis pulley belt 266 that also halts the movement of the dispensing head rotation assembly 400. This returns the dispensing head rotation assembly 400 to the home position 60 in the y-axis direction 66. Next, the computer control module 602 will send a signal to the x-axis servomotor controller 626 and this will cause the x-axis servomotor 250 to rotate the x-axis drive pulley 252. This will move the x-axis pulley belt 256, which is attached to the slide assembly 200, will move the dispensing head rotation assembly 400 (which is attached to slide assembly 200) toward the dispense valve x-axis home sensor 672. When the dispensing head rotation assembly 400 reaches the dispense valve x-axis home sensor 672, the dispense valve x-axis home sensor 672 will send a signal back to the computer control module 602. The computer control module 602 will then send a signal to the x-axis servomotor controller 626 to stop the movement of the x-axis servomotor 250 and this then halts the movement of the x-axis pulley belt 256 that also halts the movement of the dispensing head rotation assembly 400. Returning the dispensing head rotation assembly 400 to the home position 56 in the x-axis direction 64.

The final home positioning now occurs for dispensing nozzle 502. The computer control module 602 will send a signal to the swivel servomotor controller 624 which will then cause the swivel motor 416 to turn. This action will rotate the second gear 412, which is attached to the swivel servomotor 416. The second gear 412 will rotate the first gear 410. This will then rotate the first gear 410 which is connected to the swivel front hub 524 causing the dispensing nozzle 502 to rotate. The dispensing nozzle 502 will continue to rotate until the home locating hole opening 415 in the first gear 410 is aligned with the nozzle home sensor 670. When this alignment occurs, a signal is sent back to the computer controller 602. The computer control module 602 will then send a signal to the swivel servomotor controller 624 to stop the movement of the swivel servomotor 416. Thusly, returning the dispensing nozzle 502 to the home position 54. The computer control module 602 then disables the solid state relays 614 and 612 thereby disabling the rear positioning bar solenoid 72 and the left positioning bar solenoid 714. This causes the movement of the left side glass guide device 162 and the back glass guide device 166 to move back to its reset position. The insulated glass assembly apparatus 10 is ready for the next sealing operation cycle.

Advantages of the Present Invention

Accordingly, an advantage of the present invention it that it provides for an improved apparatus for automatically and continuously applying sealant material in a single continuous motion along the perimeter of an insulated glass unit assembly.

Another advantage of the present invention is that it provides for an automated system for applying sealant material that is built in a horizontal plane with the dispensing head traveling on an X-Y slide assembly, with the starting corner being in the rear left.

Another advantage of the present invention is that it provides for an automated system for applying sealant material that has the insulated glass assembly in a fixed position and held in place by suction during the sealing process with the use of an air float and suction system.

Another advantage of the present invention is that it provides for an automated system for applying sealant material that has a dispensing head which moves completely around the perimeter of the insulated glass assembly in a single continuous motion.

Another advantage of the present invention is that it provides for an automated system for applying sealant material that has the insulated glass assembly moving forward by the use of air floats when the sealant material has been completely dispensed within the insulated glass assembly.

Another advantage of the present invention is that it provides for an automated system for applying sealant material that automatically changes its alignment criteria for different sizes of air spaces, and allows for differences in the sealant space caused by improper positioning of the spacer when manufacturing the insulated glass assembly.

Another advantage of the present invention is that it provides for an automated system for applying sealant material that works for different sizes, shapes and thicknesses of glass units, with the benefit of increased efficiency due to lower maintenance and labor costs during changeovers for different sizes, shapes or thicknesses of the insulated glass assembly.

Another advantage of the present invention is that it provides for an automated system for applying sealant material that utilizes an integrated electric system which automatically adjusts for the glass unit thickness chosen, thereby effectively eliminating operator error and variations for the different glass unit thicknesses of the insulated glass assembly being produced.

Another advantage of the present invention is that it provides for an automated system for applying sealant material in an insulated glass assembly that minimizes down time and labor costs by enabling quick removal of jams, defective glass units or misapplied sealant materials to the glass unit during the operational use of the apparatus.

Another advantage of the present invention is that it provides for an automated system for applying sealant material in an insulated glass assembly that minimizes change-over time and set-up time by automatically and simultaneously adjusting the position of the dispensing nozzle head in regard to the glass units being processed.

A further advantage of the present invention is that it provides for an automated system for applying sealant material in an insulated glass assembly that is simply to manufacture and assemble and is also more cost efficient during operational use.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An apparatus for applying sealant material continuously to an insulated glass panel assembly having a spacer frame with first, second, third and fourth perimeter edges and corners defining a sealing area for receiving sealant material therein, comprising:

a) a swivel dispensing head assembly (500) having a dispensing nozzle (502) thereon for applying sealant material in a continuous motion to the sealing area of the first, second, third and fourth perimeter edges of the spacer frame of the insulated glass panel assembly;

b) said swivel dispensing head assembly (500) having a swivel rotation member sub-assembly (510) for swiveling and rotating said dispensing nozzle (502) around each of the first, second, third and fourth corners of the spacer frame of the insulated glass panel assembly, wherein said dispensing nozzle applies the sealant material within the sealing area of the spacer frame; and having a dispensing valve sub-assembly (530) for transferring and controlling the flow movement of the sealant material from a sealant material drum via a material supply hose to said dispensing nozzle;

c) a dispensing head rotation assembly (400) for rotating said swivel dispensing head assembly (500) and said dispensing nozzle (502), as said dispensing nozzle applies the sealant material around each of the first, second, third and fourth corners of the spacer frame of the insulated glass panel assembly;

d) a slide assembly for moving said dispensing head rotation assembly (400) around the first, second, third and fourth perimeter edges of the spacer frame of the insulated glass panel assembly during the sealing operation;

e) a frame assembly including a frame housing having an air float tabletop thereon; said air float tabletop including an upper wall surface, a bottom wall surface and a plurality of air and vacuum hole openings therethrough for supplying either air or vacuum to said upper wall surface of said air float tabletop; and f) a glass air float and suction assembly having a plurality of air hose members for supplying air to support and float the insulated glass panel assembly above said upper wall surface of said air float tabletop in order to properly position the insulated glass panel assembly relative to said frame assembly prior to the sealing operation and for removal of the insulated glass panel assembly after the sealing operation has been completed; and for supplying suction to clamp the insulated glass panel assembly on said upper wall surface of said air float tabletop in order to properly position the insulated glass panel assembly during the sealing operation.

2. An apparatus for applying sealant material in accordance with claim 1, wherein said bottom wall surface of said air float tabletop includes a plurality of attached air holding pans for containing air therein and for uniformly dispersing the air through said plurality of air hole openings on said upper wall surface of said air float tabletop.

3. An apparatus for applying sealant material in accordance with claim 2, wherein each of said air holding pans has one or more air hose connector ports thereon for receiving the upper end of said plurality of air hose members, respectively, in order to receive air from said glass air float and suction assembly.

4. An apparatus for applying sealant material in accordance with claim 1, wherein said frame housing includes a left glass guide device for positioning the left side of the spacer frame of the insulated glass panel assembly at a first pre-determined position on said upper wall surface of said air float tabletop prior to the sealing operation.

5. An apparatus for applying sealant material in accordance with claim 4, wherein said frame housing includes a back glass guide device for positioning the rear side of the spacer frame of the insulated glass panel assembly at a second pre-determined position on said upper wall surface of said air float tabletop prior to the sealing operation.

6. An apparatus for applying sealant material in accordance with claim 5, wherein said frame housing includes a rear glass clamp for holding the insulated glass panel assembly in place on said upper wall surface of said air float tabletop while sealing the right, front and left sides, respectively, of the spacer frame with sealant material during the sealing operation.

7. An apparatus for applying sealant material in accordance with claim 1, wherein said frame housing includes a suction cup slide having a pair of suction cups thereon for holding and gripping the insulated glass panel assembly, such that said suction cup slide allows for some movement so that said suction cups can be squeezed onto the lower panel of glass in order to more firmly hold the entire insulated glass panel assembly in place on said upper wall surface of said air float tabletop during the sealing operation.

8. An apparatus for applying sealant material in accordance with claim 1, wherein said frame housing includes a hose support sub-assembly for supporting the material supply hose that is attached to the sealant material drum, such that the material supply hose is suspended above said upper wall surface of said air float tabletop.

9. An apparatus for applying sealant material in accordance with claim 8, wherein said hose support sub-assembly includes a hose support coil spring having a rectractable and expandable wire with an attached hose clamp holder thereon for allowing movement of the material supply hose via said retractable and expandable wire as said dispensing valve sub-assembly of said swivel dispensing head assembly moves along the perimeter of said upper wall surface of said air float tabletop.

10. An apparatus for applying sealant material in accordance with claim 8, wherein said hose support sub-assembly further includes a pressure compensator valve for adjusting the sealant material flow by heat or pressure through said dispensing valve sub-assembly in order to apply the sealant material in a uniform manner via said dispensing nozzle.

11. An apparatus for applying sealant material in accordance with claim 1, wherein said slide assembly includes a vertical head slide piston for adjusting to the height of different thicknesses of the insulated glass panel assembly prior to the sealing operation, and for controlling the height in the z-axis of said dispensing head rotation assembly and said swivel dispensing head assembly.

12. An apparatus for applying sealant material in accordance with claim 1, wherein said slide assembly includes a height adjuster block for adjusting the height of said dispensing nozzle in order to correctly position said dispensing nozzle within the sealing area of the spacer frame of the insulated glass panel assembly.

13. An apparatus for applying sealant material in accordance with claim 1, wherein said glass air float and suction assembly includes an air blower for supplying air to said plurality of air and vacuum hole openings on said upper wall surface of said air float tabletop in order to support and float the insulated glass panel assembly prior to the sealing operation.

14. An apparatus for applying sealant material in accordance with claim 13, wherein said glass air float and suction assembly further includes a blower air cylinder having an air directional piston for use in moving said air directional piston for changing the air flow between a negative air flow (or vacuum) for clamping and a positive air flow (blowing) for floating of the glass panel assembly.

15. An apparatus for applying sealant material in accordance with claim 1, wherein said dispensing head rotation assembly includes a first servomotor for rotating said dispensing nozzle in conjunction with said swivel rotation member sub-assembly.

16. An apparatus for applying sealant material in accordance with claim 15, wherein said slide assembly includes a second servomotor for moving said dispensing head rotation assembly and said swivel dispensing head assembly from left to right along the x-axis of said slide assembly.

17. An apparatus for applying sealant material in accordance with claim 16, wherein said slide assembly includes a third servomotor for moving said dispensing head rotation assembly and said swivel dispensing head assembly from back to front along the y-axis of said slide assembly.

18. An apparatus for applying sealant material in accordance with claim 1, further including a first sensor for sensing and referencing said swivel dispensing head assembly in a home position for initiating the applying of sealant material at the first corner and first perimeter edge of the spacer frame of the insulated glass panel assembly.

19. An apparatus for applying sealant material in accordance with claim 18, further including a second sensor for sensing and referencing the home position of said dispensing head rotation assembly along the x-axis of said slide assembly and for actuating said dispensing head rotation assembly to be in the initial start position for receiving sealant material at the first corner and first perimeter edge of the spacer frame of the insulated glass panel assembly or for receiving sealant material at the third corner and third perimeter edge of the spacer frame of the insulated glass panel assembly.

20. An apparatus for applying sealant material in accordance with claim 19, further including a third sensor for sensing and referencing the maximum allowable distance after said dispensing head rotation assembly has moved along the x-axis of said slide assembly after the sealant material has sealed the first perimeter (rear) edge or the third perimeter (front) edge of the spacer frame of the insulated glass panel assembly.

21. An apparatus for applying sealant material in accordance with claim 20, further including a fourth sensor for sensing and referencing the home position of said dispensing head rotation assembly along the y-axis of said slide assembly and for actuating said dispensing head rotation assembly to be in the start position for receiving sealant material at the second corner and second perimeter edge or at the fourth corner and fourth perimeter edge of the spacer frame of the insulated glass assembly.

22. An apparatus for applying sealant material in accordance with claim 21, further including a fifth sensor for sensing and referencing the maximum allowable distance after said dispensing head rotation assembly has moved along the y-axis of said slide assembly after the sealant material has sealed the second or fourth perimeter edge of the spacer frame of the insulated glass panel assembly.

23. An apparatus for applying sealant material in accordance with claim 22, further including a sixth sensor for sensing and referencing the edges of the glass panel along the x-axis direction of the spacer frame for automatically sizing the length of the assembled insulated glass panel assembly in the x-axis direction.

24. An apparatus for applying sealant material in accordance with claim 23, further including a seventh sensor for sensor and referencing the edges of the glass panel along the y-axis direction of the spacer frame for automatically sizing the width of the assembled insulated glass panel assembly in the y-axis direction.

25. An apparatus for applying sealant material in accordance with claim 1, wherein said dispensing valve sub-assembly includes a sealant dispensing valve; and further including a first solenoid for actuating said sealant dispensing valve to apply sealant material to the spacer frame of the insulated glass panel assembly.

26. An apparatus for applying sealant material in accordance with claim 25, wherein said vertical head slide piston includes a dispense slide mechanism having a dispense slide valve; and further including a second solenoid for actuating said dispense slide valve for adjusting to the z-axis height in order to lower or raise said dispensing head rotation assembly and said swivel dispensing head assembly to a start position for sealing the first perimeter edge of the spacer frame of the insulated glass panel assembly.

27. An apparatus for applying sealant material in accordance with claim 26, further including a third solenoid for actuating said air directional piston of said blower air cylinder for changing the air flow between a negative air flow (or vacuum) for clamping and a positive air flow (blowing) for floating of the glass panel assembly, in order to clamp or float, respectively, the insulated glass panel assembly on said upper wall surface of said air float tabletop.

28. An apparatus for applying sealant material in accordance with claim 27, further including a fourth solenoid for actuating said left glass guide device in order to properly position and place the left side of the spacer frame of the insulated glass panel assembly at said first pre-determined position on said upper wall surface of said air float tabletop when in a float mode prior to the sealing operation.

29. An apparatus for applying sealant material in accordance with claim 28, further including a fifth solenoid for actuating said back glass guide device in order to properly position and place the first perimeter edge of the spacer frame of the insulated glass panel assembly at said second pre-determined position on said upper wall surface of said air float tabletop when in a float mode prior to the sealing operation.

30. An apparatus for applying sealant material in accordance with claim 29, further including a sixth solenoid for actuating said rear glass clamp in order to hold the insulated glass panel assembly in place on said upper wall surface of said air float tabletop when in a clamp mode while sealing the second, third and fourth perimeter edges, respectively, of the spacer frame with sealant material during the sealing operation.

31. An apparatus for applying sealant material in accordance with claim 30, further including a seventh solenoid for actuating said suction cup slide in order to move said suction cup slide such that said pair of suction cups are squeezed onto the upper glass panel for additional holding in place of the insulated glass panel assembly on said upper wall surface of said air float tabletop when in a clamp mode during the sealing operation.

32. An apparatus for applying sealant material in accordance with claim 1, further including an electronic control system for electronically controlling the sealing operation of said apparatus.

33. An apparatus for applying sealant material in accordance with claim 32, wherein said electronic control system includes a computer control module, a power supply, a plurality of solid state relays being electronically connected to a plurality of actuating means, a plurality of servomotor controllers being electronically connected to a plurality of means for rotating, a plurality of sensing means for positioning said slide assembly and said dispensing head rotation assembly, a main contactor, a mounted control panel box and a portable and movable control panel cabinet.

34. An apparatus for applying sealant material in accordance with claim 33, wherein said mounted control panel box include heating control means, power control means and signaling means.

35. An apparatus for applying sealant material in accordance with claim 33, wherein said portable and movable control panel cabinet include heating control means, power control means and signaling means.

36. An apparatus for applying sealant material in accordance with claim 34, wherein said heating control means for said mounted control panel box includes a first heat controller member for regulating the heat of the sealant material going through said swivel dispensing head assembly, and a second heat controller member for regulating the heat of the sealant material going through said pressure compensator valve.

37. An apparatus for applying sealant material in accordance with claim 34, wherein said power control means for said mounted control panel box includes a first power button for controlling said power supply, and a first reset button for sending electrical power from said power supply to said main contactor in order to lock said main contactor in the "ON" position.

38. An apparatus for applying sealant material in accordance with claim 34, wherein said signaling means for said mounted control panel box includes a ready light for signaling the operator that said apparatus is up to temperature and ready for operational use, and a first power-on light for signaling the operator that electrical power has been supplied to said main contactor and said apparatus is ready for operational use by the operator.

39. An apparatus for applying sealant material in accordance with claim 35, wherein said heating control means for said portable and movable control panel cabinet includes a third head controller member for regulating the heat of the sealant material going through said swivel dispensing head assembly and a fourth heat controller member for regulating the heat of the sealant material going through said pressure compensator valve.

40. An apparatus for applying sealant material in accordance with claim 35, wherein said power control means for said portable and movable control panel cabinet includes a second power button for controlling said power supply, a second reset button for sending electrical power from said power supply to said main contactor in order to lock said main contactor in the "ON" position, and a first emergency stop button for allowing the operator to instantaneously stop the sealing operation of said apparatus when a problem occurs.

41. An apparatus for applying sealant material in accordance with claim 35, wherein said signaling means for said portable and movable control panel cabinet includes a start light for signaling the operator that said apparatus is ready for operational use thereof, a second power-on light for signaling the operator that electrical power has been supplied to said main contactor and said apparatus is ready for operational use by the operator, and a reset light for signaling the operator that said first power button or said second power button is in the "ON" position and said main contactor which supplies the electrical power to the remaining assemblies of said apparatus is in an "OFF" position.

42. An apparatus for applying sealant material in accordance with claim 32, wherein said electronic control system further includes a foot pedal start-up switch for initializing and powering-up of said electronic control system of said apparatus by the operator, and a second emergency stop button for allowing the operator to instantaneously stop the sealing operation of said apparatus when a problem occurs being located on said frame housing.

43. An apparatus for applying sealant material in accordance with claim 33, further including an electro-pneumatic control system for controlling said air float and suction assembly and said plurality of actuating means.

44. An apparatus for applying sealant material in accordance with claim 43, wherein said electro-pneumatic control system includes an air compressor having air regulator connected thereto, and a plurality of inlet and outlet air lines.

45. An apparatus for applying sealant material in accordance with claim 44, wherein said air compressor provides pressurized air to said plurality of inlet and outlet air lines at a pressure of at least 80 psig.

46. An apparatus for applying sealant material in accordance with claim 35, wherein said power control means for said portable and movable control panel cabinet further includes a start button being used for positioning said apparatus to its home position prior to the start of the sealing operation cycle.

47. An apparatus for applying sealant material in accordance with claim 1, wherein said air float tabletop is made from a single formed unit and made from materials selected from the group consisting of metals, plastic composites and combinations thereof.

48. An apparatus for applying sealant material in accordance with claim 1, wherein said air float tabletop is made from a plurality of sectional units and made from materials selected from the group consisting of metals, plastic composites and combinations thereof.

* * * * *